United States Patent
Kawasaki et al.

(10) Patent No.: US 11,963,240 B2
(45) Date of Patent: Apr. 16, 2024

(54) USER DEVICE, CONTROL DEVICE, AND COMMUNICATION CONTROL METHOD

(71) Applicants: SHARP KABUSHIKI KAISHA, Sakai (JP); FG Innovation Company Limited, Tuen Mun (HK)

(72) Inventors: Yudai Kawasaki, Sakai (JP); Tsuyoshi Takakura, Sakai (JP); Masafumi Aramoto, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 312 days.

(21) Appl. No.: 17/293,942

(22) PCT Filed: Nov. 7, 2019

(86) PCT No.: PCT/JP2019/043717
§ 371 (c)(1),
(2) Date: May 14, 2021

(87) PCT Pub. No.: WO2020/100719
PCT Pub. Date: May 22, 2020

(65) Prior Publication Data
US 2022/0015158 A1 Jan. 13, 2022

(30) Foreign Application Priority Data

Nov. 16, 2018 (JP) .................................. 2018-215878

(51) Int. Cl.
*H04W 4/00* (2018.01)
*H04W 60/00* (2009.01)
(Continued)

(52) U.S. Cl.
CPC ........... *H04W 76/10* (2018.02); *H04W 60/00* (2013.01); *H04W 76/18* (2018.02); *H04W 76/19* (2018.02)

(58) Field of Classification Search
None
See application file for complete search history.

(56) References Cited

U.S. PATENT DOCUMENTS 10,299,128 B1 * 5/2019 Suthar ....................... H04L 9/30
10,491,376 B1 * 11/2019 Suthar ................... H04L 63/102
(Continued)

FOREIGN PATENT DOCUMENTS

| CN | 107431875 A | 12/2017 |
| CN | 108464054 A | 8/2018 |

(Continued)

OTHER PUBLICATIONS

3GPP TS 24.501 V15.1.0 (Sep. 2018) Brd Generation Partnership Project; Technical Specification Group Core Network and Terminals; Non-Access-Stratum (NAS) protocol for 5G System (5GS); Stage 3 (Release 15).

(Continued)

*Primary Examiner* — Bob A Phunkulh
(74) *Attorney, Agent, or Firm* — ScienBiziP, P.C.

(57) ABSTRACT

A user device for implementing error handling is provided. The user device comprises a control unit that establishes, in a Protocol Data Unit (PDU) session establishment procedure using a Local Area Data Network (LADN) Data Network Name (DNN), a PDU session for the LADN; and a transceiver unit that prohibits transmission of a PDU session modification request message for the PDU session, in a PDU session modification procedure, based on reception of a (Continued)

specific cause value, wherein the LADN DNN is provided by the user device in the PDU session establishment procedure.

5 Claims, 7 Drawing Sheets

(51) Int. Cl.
*H04W 76/10* (2018.01)
*H04W 76/18* (2018.01)
*H04W 76/19* (2018.01)

(56) References Cited

U.S. PATENT DOCUMENTS

| | | |
|---|---|---|
| 2018/0279400 A1 | 9/2018 | Faccin et al. |
| 2020/0178158 A1* | 6/2020 | Won .................. H04W 48/18 |
| 2020/0404734 A1* | 12/2020 | Watfa .................. H04W 76/19 |
| 2021/0136719 A1* | 5/2021 | Kim .................. H04W 60/04 |
| 2021/0153018 A1* | 5/2021 | Fernandez Alonso ...................... H04W 28/06 |
| 2021/0194634 A1* | 6/2021 | Sedlacek .................. H04L 1/14 |

FOREIGN PATENT DOCUMENTS

| | | |
|---|---|---|
| CN | 108811009 A | 11/2018 |
| WO | 2018126535 A1 | 7/2018 |
| WO | 2018128126 A1 | 7/2018 |

OTHER PUBLICATIONS

Sharp, "Clarification on 5GSM cause_without back-off timer_#46 out of LADN service area", C1-186648 3GPP TSG-CT WG1 Meeting #112bis, Vilnius (Lithuania), Oct. 15-19, 2018.

Sharp, "DISC on 5GSM cause other than congestion control", C1-186418 3GPP TSG-CT WG1 Meeting #112bis, Vilnius (Lithuania), Oct. 15-19, 2018.

3GPP TS 23.501, "3rd Generation Partnership Project; Technical Specification Group Services and System Aspects; System Architecture for the 5G System; Stage 2 (Release 15)", V15.2.0 (Jun. 2018).

3GPP TS 23.502, "3rd Generation Partnership Project; Technical Specification Group Services and System Aspects; Procedures for the 5G System; Stage 2 (Release 15)", V15.2.0 (Jun. 2018).

Nokia et al., "Back-off and retry restriction mechanisms in 5GS", C1-186508, 3GPP TSG-CT WG1 Meeting #112bis, Vilnius (Lithuania), Oct. 15-19, 2018, sections 6.2.x, 6.4.1.4, 6.4.2.4, 8.3.3.1, 8.3.3.2, 8.3.3.a, 8.3.3.y, 8.3.8.1, 8.3.8.a, 8.3.8.z, 9.11.4.2, 9.11.4.j, 9.11.4.x, 10.3, B.1.

Huawei et al., "Addition of 5GSM cause values", C1-186389, 3GPP TSG-CT WG1 Meeting #112bis, Vilnius (Lithuania), Oct. 15-19, 2018, sections 6.3.3.2, 6.4.1.4, 6.4.2.4, annex B.

Vivo, "SM cause for out of LAND service area", C1-184860, 3GPP Tsg-Ct WG1 Meeting #111 bis, Sophia-Antipolis (France), Jul. 9-13, 2018, sections title, reason for change, 6.3.3.2, 6.4.1.4.1, 6.4.2.4, 9.10.4.2.

3GPP TS 24.501 V16.2.0(Sep. 2019), 3rd Generation Partnership Project; Technical Specification Group Core Network and Terminals; Non-Access-Stratum (NAS) protocol for 5G System (5GS); Stage 3 (Release 15), F-06921, Sophia-Antipolis Cedex; France, Sep. 24, 2019, sections 5.5, 6 , in particular subsection 6.4, sections 8.3, 9.11.3.29, 9.11.3.30, annex B.

Mediatek Inc., "UE handling upon receipt of 5GSM #46 out of LADN service area", C1-198432, 3GPP TSG-CT WG1 Meeting #121, Reno (NV), USA, Nov. 11-15, 2019, sections title, reason for change, summary of change, 6.4.1.4.3, 6.4.2.4.3.

Huawei et al., "LADN information update and session release", C1-180297, 3GPP TSG-CT WG1 Meeting #108, Gothenburg (Sweden), Jan. 22-26, 2018 (Jan. 27, 2018).

China Mobile, "23.502: Provide UDM the SMF address after Session establishment", S2-172413, SA WG2 Meeting #S2-120, Mar. 27-31, 2017, Busan, Korea (Apr. 3, 2017).

* cited by examiner

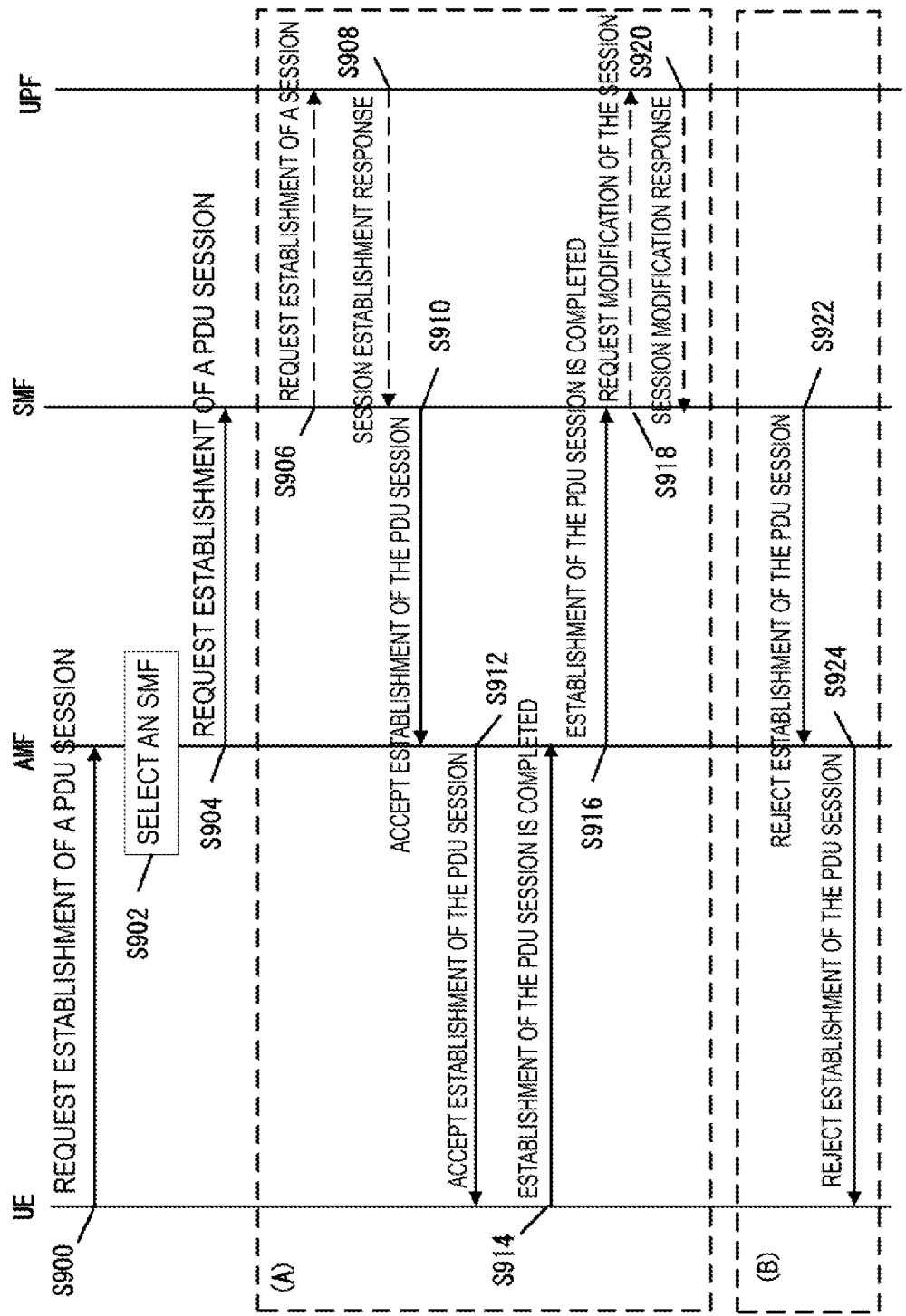

USER DEVICE, CONTROL DEVICE, AND COMMUNICATION CONTROL METHOD

TECHNICAL FIELD

The present disclosure relates to a user device, a control device, and a communication control method. The present application claims priority on the basis of Japanese Patent Application No. 2018-215878 filed in Japan on Nov. 16, 2018, which is incorporated herein by reference.

BACKGROUND

In the 3rd Generation Partnership Project (3GPP), research has been conducted on a system architecture of a next-generation mobile communication system, namely, a fifth-generation (5G) mobile communication system or a 5G System (5GS), and new procedures or support for new functions are under discussion (refer to Non-Patent Document 1 and Non-Patent Document 2).

For example, the following conditions can also be regarded as requirements: optimization and diversification of a communication procedure adapted to various services and supporting a continuous mobile communication service need to be achieved, or optimization of a system architecture corresponding to the optimization and diversification of the communication procedure needs to be achieved, or the like.

PRIOR ART DOCUMENTS

Non-Patent Documents

Non-Patent Document 1: 3GPP TS 23.501 v15.2.0 (2018 June); Technical Specification Group Services and System Aspects; System Architecture for the 5G System; Stage 2 (Release 15)
Non-Patent Document 2: 3GPP TS 23.502 v15.2.0 (2018 June); Technical Specification Group Services and System Aspects; Procedures for the 5G System; Stage 2 (Release 15)
Non-Patent Document 3: 3GPP TS 24.501 v15.0.0 (2018 June); Technical Specificatin Group Core Network and Terminals; Non-Access-Straturn (NAS) protocol for 5G System (5GS); Stage 3 (Release 15)

SUMMARY

Technical Problem to be Solved by the Present Invention

In a 5G System (5GS), in order to provide various services, a 5G Core Network (5GCN) to serve as a novel core network is under research. In addition, in the 5GS, new functions such as a function to provide connectivity to a Local Area Data Network (LADN) are supported.

However, if the connectivity to the LADN cannot be provided or the connectivity to LADN cannot be modified, then processing on a control device of the core network and processing on a user device are not clear.

One aspect of the present invention focuses on the above cases, and aims to provide a method for implementing error handling on a control device of a core network and error handling on a user device if connectivity to an LADN cannot be provided in a 5GS or if the connectivity to the LADN cannot be modified.

Solution to the Problem

A user device for implementing error handling according to an embodiment of the present invention comprises: a control unit that establishes, in a Protocol Data Unit (PDU) session establishment procedure using a Local Area Data Network (LADN) Data Network Name (DNN), a PDU session for the LADN; and a transceiver unit that prohibits transmission of a PDU session modification request message for the PDU session, in a PDU session modification procedure, based on reception of a specific cause value, wherein the LADN DNN is provided by the user device in the PDU session establishment procedure.

A control device for implementing error handling according to an embodiment of the present invention comprises: a transceiver unit that transmits, in a Protocol Data Unit (PDU) session modification procedure, a specific cause value to a user device in order to indicate that the user device is prohibited from transmitting a PDU session modification request message for a PDU session for a Local Area Data Network (LADN), wherein: the PDU session for the LADN is established in a PDU session establishment procedure using an LADN Data Network Name (DNN); and the LADN DNN is provided in the PDU session establishment procedure.

A communication control method for a user device implementing error handling according to an embodiment of the present invention comprises: establishing a Protocol Data Unit (PDU) session for a Local Area Data Network (LADN) in a PDU session establishment procedure that uses an LADN Data Network Name (DNN); and prohibiting transmission of a PDU session modification request message for the PDU session, in a PDU session modification procedure, based on reception of a specific cause value, wherein the LADN DNN is provided by the user device in the PDU session establishment procedure.

Effect of the Invention

According to one aspect of the present invention, error handling on a control device of a core network and error handling on a user device can be implemented in the case in which connectivity to an LADN cannot be provided in a 5GS or in the case in which the connectivity to the LADN cannot be modified.

BRIEF DESCRIPTION OF THE DRAWINGS

FIG. 7 is a diagram illustrating a PDU session establishment procedure.

DETAILED DESCRIPTION

Optimal embodiments of the present invention are described with reference to the accompanying drawings.

1. System Overview

Figure 1:
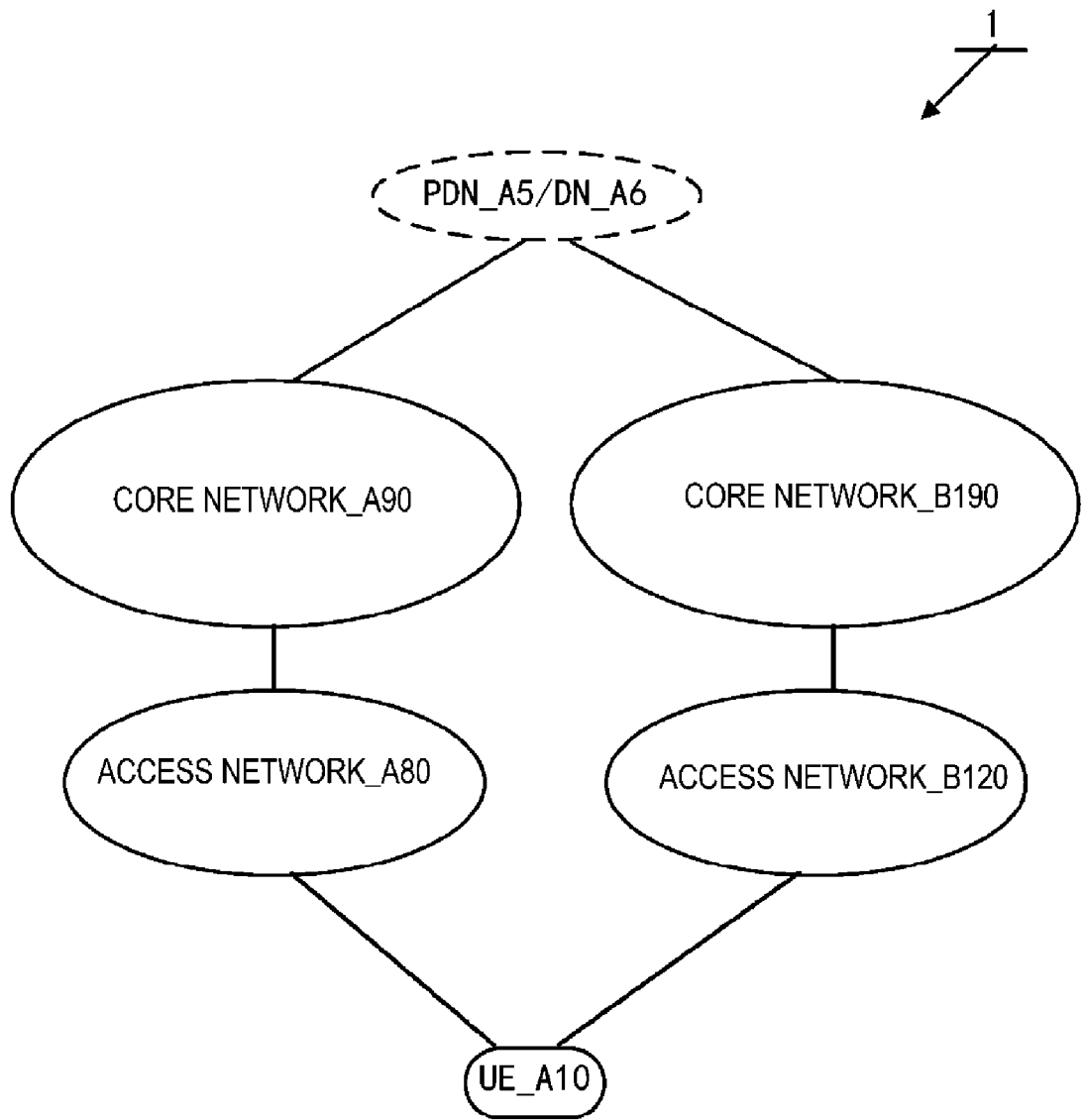
FIG. 1 is a diagram illustrating a skeleton of a mobile communication system (EPS/5GS).
Figure 2:
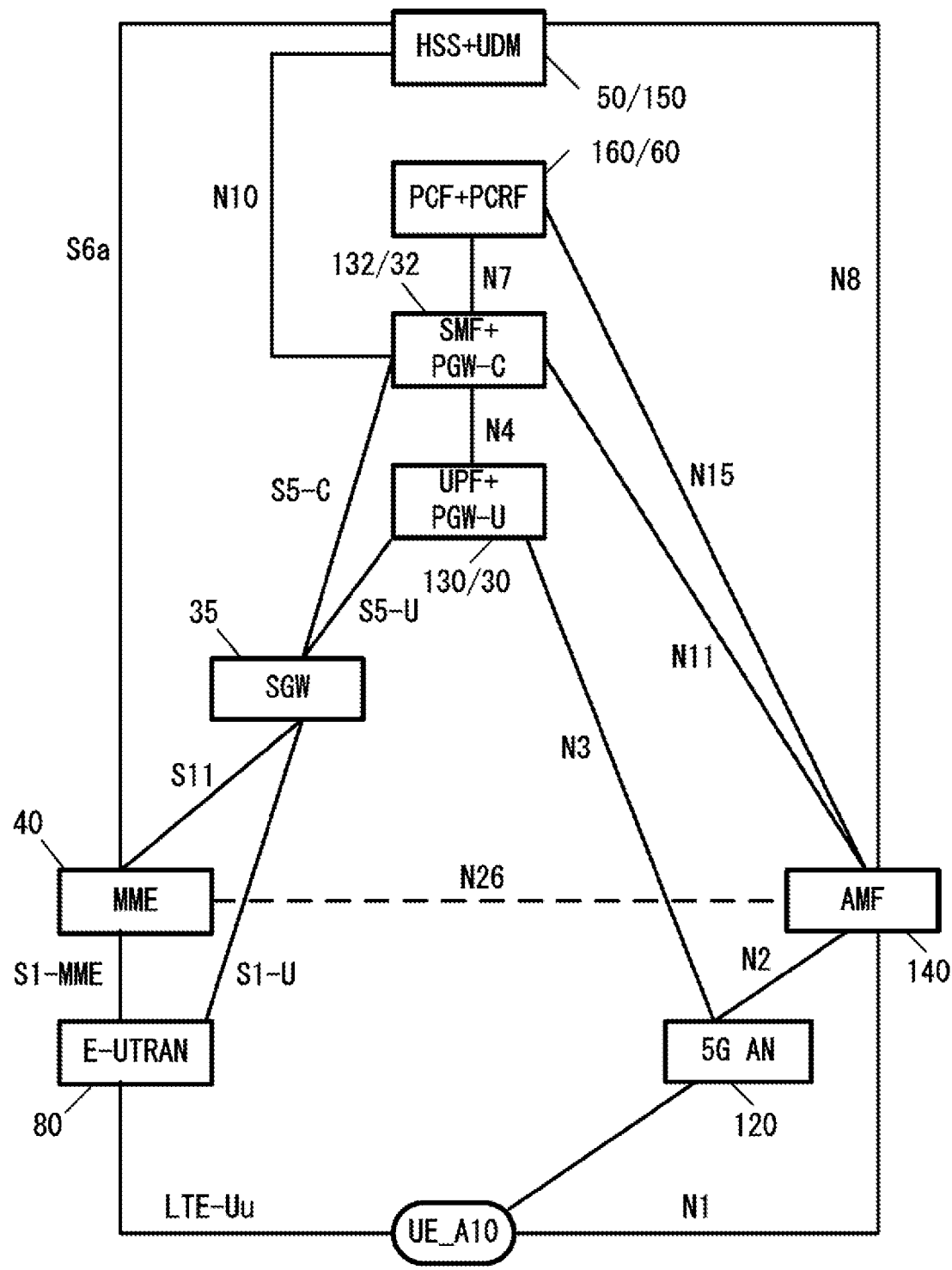
FIG. 2 is a diagram illustrating a detailed structure of a mobile communication system (EPS/5GS).

Firstly, FIG. 1 is a diagram illustrating a skeleton of a mobile communication system 1 used in each embodiment, and FIG. 2 is a diagram illustrating a detailed structure of the mobile communication system 1.

FIG. 1 illustrates that the mobile communication system 1 consists of UE_A10, an access network_A80, a core network_A90, a Packet Data Network (PDN)_A5, an access network_B120, a core network_B190, and a Data Network (DN)_A6.

The reference numerals of these devices and functions may be omitted hereinafter, such as UE, an access network_A, a core network_A, a PDN, an access network_B, a core network_B, a DN, etc.

In addition, FIG. 2 illustrates devices and functions such as UE_A10, an E-UTRAN80, an MME40, an SGW35, a PGW-U30, a PGW-C32, a PCRF60, an HSS50, a 5G AN120, an AMF140, a UPF130, an SMF132, a PCF160, a UDM150, etc., and interfaces for connecting these devices and functions to each other.

The reference numerals of these devices and functions may be omitted hereinafter, such as UE, an E-UTRAN, an MME, an SGW, a PGW-U, a PGW-C, a PCRF, an HSS, a 5G AN, an AMF, a UPF, an SMF, a PCF, a UDM, etc.

In addition, an Evolved Packet System (EPS) serving as a 4G system is configured to include the access network_A and the core network_A, and may further include the UE and/or the PDN. In addition, a 5G System (5GS) serving as a 5G system is configured to include the UE, the access network_B, and the core network_B, and may further include the DN.

The UE is a device that can be connected to a network service by means of 3GPP access (also referred to as a 3GPP access network or a 3GPP AN) and/or non-3GPP access (also referred to as a non-3GPP access network or a non-3GPP AN). The UE may be a terminal device capable of performing wireless communication such as a mobile phone or a smartphone, or may be a terminal device that can be connected to an EPS and can also be connected to a 5GS. The UE may also have a Universal Integrated Circuit Card (UICC) or an embedded UICC (eUICC). In addition, the UE may be implemented as a user device, or may also be implemented as a terminal device.

In addition, the access network_A corresponds to an Evolved Universal Terrestrial Radio Access Network (E-UTRAN) and/or a wireless Local Area Network (LAN) access network. The E-UTRAN is provided with one or more evolved Nodes B (eNBs) 45. In addition, the reference numeral of the eNB45 may be omitted hereinafter, such as eNB. In addition, if a plurality of eNBs exist, then the eNBs are connected to each other by means of, for example, an X2 interface. In addition, in the wireless LAN access network, one or more access points are provided.

In addition, the access network_B corresponds to a 5G access network (5G AN). The 5G AN consists of a Next Generation Radio Access Network (NG-RAN) and/or a non-3GPP access network. The NG-RAN is provided with one or more NR Nodes B (gNBs) 122. In addition, the reference numeral of the gNB122 may be omitted hereinafter, such as eNB. The gNB is a node providing a New Radio (NR) user plane and an NR control plane to the UE, and is a node connected to a 5GCN by means of an NG interface (including an N2 interface or an N3 interface). That is, the gNB is a base station device newly designed for the 5GS, and has functions different from functions of a base station device (eNB) used by the EPS serving as the 4G system. In addition, if a plurality of gNBs exist, the gNBs are connected to each other by means of, for example, an Xn interface.

In addition, hereinafter, the E-UTRAN or the NG-RAN is sometimes referred to as 3GPP access. In addition, the wireless LAN access network or the non-3GPP AN is sometimes referred to as non-3GPP access. In addition, sometimes, nodes deployed in the access network_B are collectively referred to as NG-RAN nodes.

In addition, hereinafter, the access network_A and/or the access network_B and/or a device included in the access network_A and/or a device included in the access network B are sometimes referred to as an access network or an access network device.

In addition, the core network_A corresponds to an Evolved Packet Core (EPC). The EPC is provided with, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), etc.

In addition, the core network_B corresponds to a 5G Core Network (5GCN). The 5GCN is provided with, for example, an Access and Mobility Management Function (AMF), a User Plane Function (UPF), a Session Management Function (SMF), a Policy Control Function (PCF), a Unified Data Management (UDM), etc. Here, the 5GCN may also be implemented as 5G.

In addition, hereinafter, the core network_A and/or the core network_B and the device included in the core network_A and/or the device included in the core network_B are sometimes referred to as a core network or a core network device.

The core network (the core network_A and/or the core network_B) may be an Internet Protocol (IP) mobile communication network used by a Mobile Network Operator (MNO) that connects the access network (the access network_A and/or the access network_B) to the PDN and/or the DN, or may be a core network used by a mobile network operator that operates and manages the mobile communication system 1, or may also be a core network used by a mobile virtual operator or a mobile virtual service provider such as a Mobile Virtual Network Operator (MVNO) and a Mobile Virtual Network Enabler (MVNE).

In addition, FIG. 1 illustrates a case in which the PDN and the DN are the same; however, the two may be different. The PDN may also be a Data Network (DN) providing communication services to the UE. In addition, the DN may also be configured to be a packet data service network, or may also be individually configured for each service. Furthermore, the PDN may also include a communication terminal connected thereto. Therefore, the so-called connection to the PDN may also be a connection to the communication terminal or a server device provided in the PDN. Furthermore, so-called receiving and transmitting user data from/to the PDN may also be receiving and transmitting user data from/to the communication terminal or the server device provided in the PDN. In addition, the PDN may also be implemented as the DN, or the DN may also be implemented as the PDN.

In addition, hereinafter, at least part of the access network_A, the core network_A, the PDN, the access network_B, the core network_B, and the DN and/or one or more devices included therein are referred to as networks or network devices. That is, so-called a network and/or a network device receiving and transmitting information and/or executing a procedure refers to that at least part of the access network_A, the core network_A, the PDN, the access network_B, the core network_B, and the DN and/or one or more devices included therein receive and transmit information and/or execute a procedure.

In addition, the UE can be connected to the access network. In addition, the UE can be connected to the core network by means of the access network. Furthermore, the UE can be connected to the PDN or the DN by means of the access network and the core network. That is, the UE can receive and transmit user data (perform communication) from/to the PDN or the DN. During reception and transmission of user data, not only Internet Protocol (IP) communication but also non-IP communication can be used.

Here, the so-called IP communication refers to data communication using an IP, and data is received and transmitted by means of IP packets. The IP packet consists of an IP head and a payload portion. The payload portion includes data received and transmitted by the devices and the functions included in the EPS or by the devices and the functions included in the 5GS. In addition, the so-called non-IP communication is data communication not using any IP, and data is received and transmitted in a form different from the structure of the IP packet. For example, the non-IP communication may be data communication implemented by receiving and transmitting application data to which no IP header is added or by using UE to receive and transmit user data to which other header such as a MAC header or an Ethernet (registered trademark) header is added.

2. Structure of Each Device

Next, the structure of each device (the UE and/or the access network device and/or the core network device) used in each embodiment is described with reference to the accompanying drawings. In addition, each device may be configured to be physical hardware, or may be configured to be logical (virtual) hardware provided on general-purpose hardware, or may also be configured to be software. In addition, at least part of (including all of) the functions of each device can also be configured to be physical hardware, logical hardware, or software.

In addition, each storage portion (a storage portion_A340, a storage portion_A440, a storage portion_B540, a storage portion_A640, and a storage portion_B740) in each device and function described below consists of, for example, a semiconductor memory, a Solid State Drive (SSD), a Hard Disk Drive (HDD), etc. In addition, each storage portion can store information configured by default in the factory, and can also store various information received from or to be transmitted to devices and functions (such as the UE and/or the access network device and/or the core network device and/or the PDN and/or the DN) other than the device and the function thereof. In addition, each storage portion can store identification information, control information, flags, parameters, etc., included in control messages received and transmitted in various communication procedures described below. In addition, each storage portion can also store such information for each UE. In addition, if interwork between the 5GS and the EPS is implemented, then each storage portion can store control messages or user data received and transmitted between the devices and the functions included in the 5GS and/or the EPS. In this case, control messages or user data received and transmitted by means of an N26 interface can be stored, and control messages or user data received and transmitted without the N26 interface can also be stored.

[2.1 Device Structure of UE]

Figure 3:
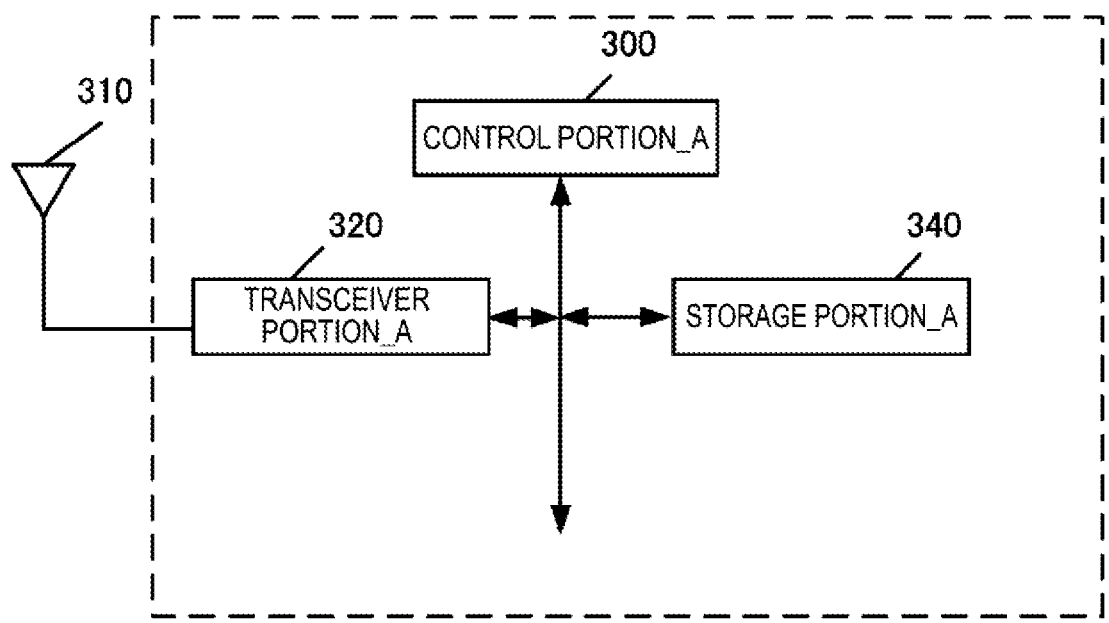
FIG. 3 is a diagram illustrating a device structure of UE.

Firstly, an example of the device structure of the User Equipment (UE) is described with reference to FIG. 3. The UE consists of a control portion_A300, an antenna 310, a transceiver portion_A320, and a storage portion_A340. The control portion_A300, the transceiver portion_A320, and the storage portion_A340 are connected to each other by means of a bus. The transceiver portion_A320 is connected to the antenna 310.

The control portion_A300 is a functional portion for controlling overall operations and functions of the UE. The control portion_A300 reads and executes various programs stored in the storage portion_A340 according to requirements so as to achieve various processing in the UE.

The transceiver portion_A320 is a functional portion for wirelessly communicating with a base station device (eNB or gNB) in the access network by means of the antenna. That is, the UE can use the transceiver portion_A320 to receive and transmit user data and/or control information from/to the access network device and/or the core network device and/or the PDN and/or the DN.

Detailed description is provided with reference to FIG. 2. The UE can use the transceiver portion_A320 to communicate with a base station device (eNB) in the E-UTRAN by means of an LTE-Uu interface. In addition, the UE can use the transceiver portion_A320 to communicate with a base station device (gNB) in the 5G AN. In addition, the UE can use the transceiver portion_A320 to receive and transmit an AMF message and a Non-Access-Stratum (NAS) message by means of an N1 interface. However, since the N1 interface is logical, communication between the UE and the AMF is actually performed by means of the 5G AN.

The storage portion_A340 is a functional portion for storing programs, user data, control information, etc., required by the operations of the UE.

[2.2 Device Structure of gNB]

Figure 4:
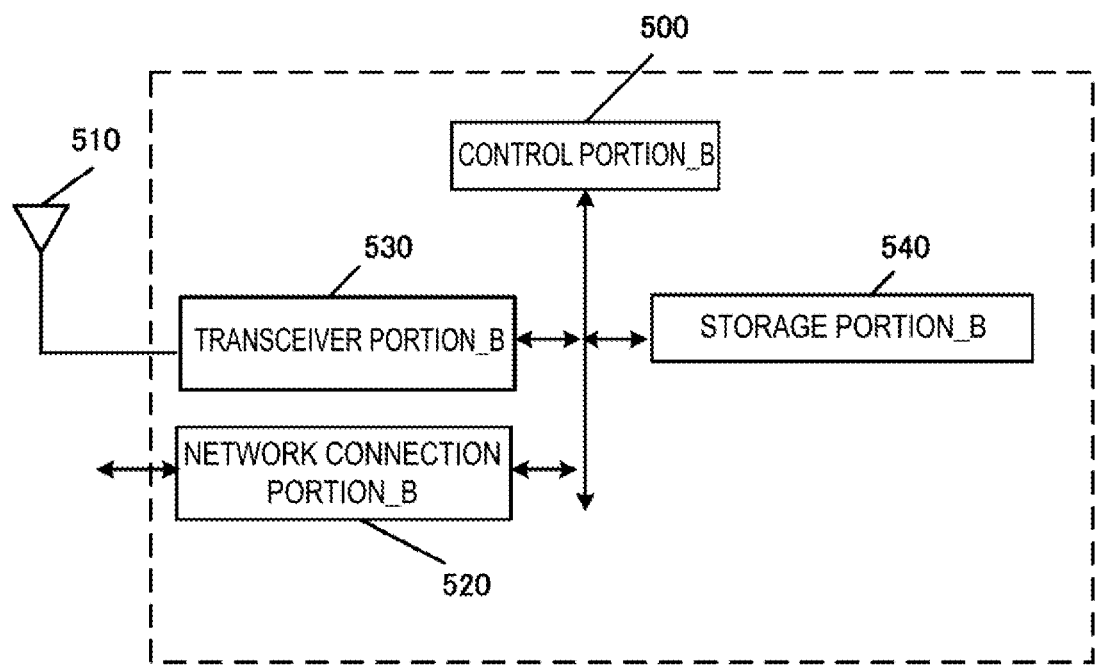
FIG. 4 is a diagram illustrating a structure of an access network device (gNB) in a 5GS.

Next, an example of the device structure of the gNB is described with reference to FIG. 4. The gNB consists of a control portion_B500, an antenna 510, a network connection portion_B520, a transceiver portion_B530, and a storage portion_B540. The control portion_B500, the network connection portion_B520, the transceiver portion_B530, and the storage portion_B540 are connected to each other by means of a bus. The transceiver portion_B530 is connected to the antenna 510.

The control portion_B500 is a functional portion for controlling overall operations and functions of the gNB. The control portion_B500 reads and executes various programs stored in the storage portion_B540 according to requirements so as to achieve various processing in the gNB.

The network connection portion_B520 is a functional portion for the gNB to communicate with the AMF and/or the UPF. That is, the gNB can use the network connection portion_B520 to receive and transmit user data and/or control information from/to the AMF and/or the UPF.

The transceiver portion_B530 is a functional portion for wirelessly communicating with the UE by means of the antenna 510. That is, the gNB can use the transceiver portion_B530 to receive and transmit user data and/or control information from/to the UE.

Detailed description is provided with reference to FIG. 2. The gNB in the 5G AN can use the network connection portion_B520 to communicate with the AMF by means of the N2 interface and communicate with the UPF by means of the N3 interface. In addition, the gNB can use the transceiver portion_B530 to communicate with the UE.

The storage portion_B540 is a functional portion for storing programs, user data, control information, etc., required by the operations of the gNB.

[2.3 Device Structure of AMF]

Figure 5:
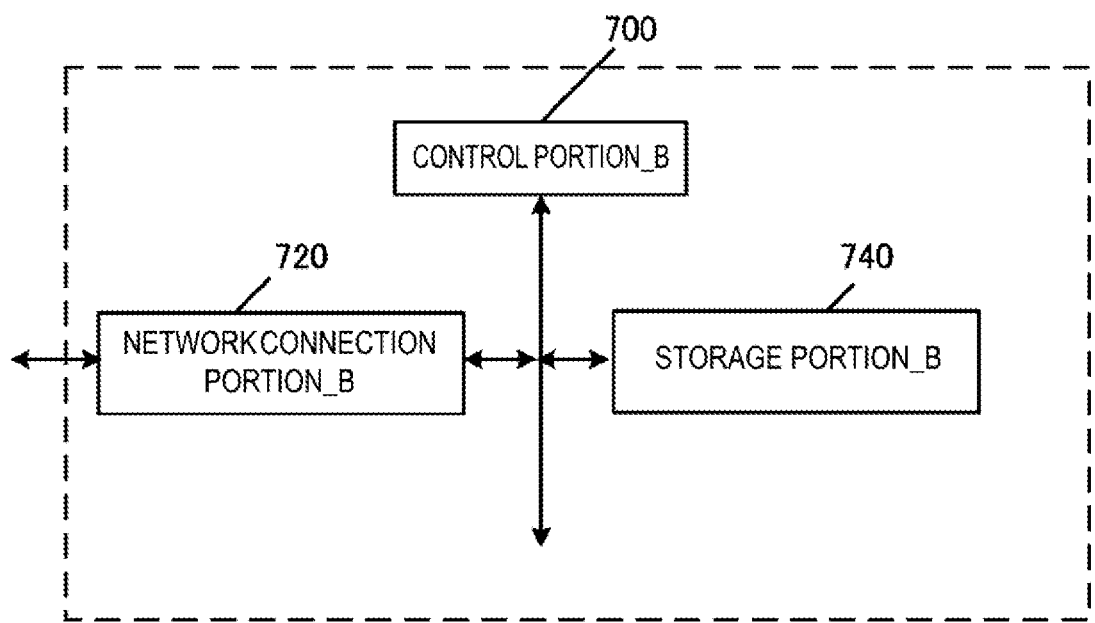
FIG. 5 is a diagram illustrating a structure of a core network device (AMF/SMF/UPF) in a 5GS.

Next, an example of the device structure of the AMF is described with reference to FIG. 5. The AMF consists of a control portion_B700, a network connection portion_B720, and a storage portion_B740. The control portion_B700, the network connection portion_B720, and the storage portion_B740 are connected to each other by means of a bus. The AMF may also be a node for operating the control plane.

The control portion_B700 is a functional portion for controlling overall operations and functions of the AMF. The control portion_B700 reads and executes various programs stored in the storage portion_B740 according to requirements so as to achieve various processing in the AMF.

The network connection portion_B720 is a functional portion for connecting the AMF to the base station device (gNB) and/or an SMF and/or a PCF and/or a UDM and/or an SCEF in the 5G AN. That is, the AMF can use the network connection portion_B720 to receive and transmit user data and/or control information from/to the base station device (gNB) and/or the SMF and/or the PCF and/or the UDM and/or the SCEF in the 5G AN.

Detailed description is provided with reference to FIG. 2. The AMF in the 5GCN can use the network connection portion_A620 to communicate with the gNB by means of the N2 interface, communicate with the UDM by means of an N8 interface, communicate with the SMF by means of an N11 interface, and communicate with the PCF by means of an N15 interface. In addition, the AMF can use the network connection portion_A620 to receive and transmit NAS messages from/to the UE by means of the N1 interface. However, since the N1 interface is logical, communication between the UE and the AMF is actually performed by means of the 5G AN. In addition, if the AMF supports an N26 interface, then the AMF can use the network connection portion_A620 to communicate with the MME by means of the N26 interface.

The storage portion_B740 is a functional portion for storing programs, user data, control information, etc., required by the operations of the AMF.

In addition, the AMF has the following functions: a function to use the N2 interface to exchange control messages with the RAN, a function to use the N1 interface to exchange NAS messages with the UE, a function for encryption and integrity protection of NAS messages, a Registration Management (RM) function, a Connection Management (CM) function, a reachability management function, a mobility management function for the UE and the like, a function to forward a Session Management (SM) message between the UE and the SMF, an access authentication function, a Security Anchor Functionality (SEA), a Security Context Management (SCM) function, a function to support an N2 interface for a Non-3GPP Interworking Function (N3IWF), a function to support reception and transmission of a NAS signal from/to the UE performed by means of the N3 IWF, a function to authenticate UE connected by means of the N3 IWF, etc.

In addition, in registration management, an RM state of each UE is managed. The RM state can also be synchronized between the UE and the AMF. The RM state includes a non-registered state (RM-DEREGISTERED state) and a registered state (RM-REGISTERED state). In the RM-DEREGISTERED state, the UE is not registered with the network, so that UE text in the AMF does not have any valid location information or routing information for the UE; therefore, the state indicates that the AMF cannot reach the UE. In addition, in the RM-REGISTERED state, the UE is registered with the network, so that the UE can receive a service required by registration with the network. In addition, the RM state may also be implemented as a 5GMM state. In this case, the RM-DEREGISTERED state may also be implemented as a 5GMM-DEREGISTERED state, and the RM-REGISTERED state may also be implemented as a 5GMM-REGISTERED state.

In other words, the 5GMM-REGISTERED state may be a state in which 5GMM text is established for each device, or may also be a state in which PDU session text is established. In addition, if each device is in the 5GMM-REGISTERED state, then the UE_A10 may initiate reception and transmission of user data or control messages, or may also respond to paging. Furthermore, if each device is in the 5GMM-REGISTERED state, then the UE_A10 may also execute registration procedures other than a registration procedure for initial registration and/or a service request procedure.

Furthermore, the 5GMM-DEREGISTERED state may also be a state in which no 5GMM text is established for any device, or may also be a state in which location information of the UE_A10 is not acquired by the network, or may also be a state in which the network cannot reach the UE_A10. In addition, if each device is in the 5GMM-DEREGISTERED state, then the UE_A10 may also initiate the registration procedure or may also establish 5GMM text by executing the registration procedure.

In addition, in connection management, a CM state of each UE is managed. The CM state can also be synchronized between the UE and the AMF. The CM state includes a non-connected state (CM-IDLE state) and a connected state (CM-CONNECTED state). In the CM-IDLE state, the UE is in the RM-REGISTERED state, but does not have any NAS signaling connection to the AMF established by means of the N1 interface. In addition, in the CM-IDLE state, the UE does not have any N2 interface connection (N2 connection) nor any N3 interface connection (N3 connection). On the other hand, in the CM-CONNECTED state, a NAS signaling connection to the AMF established by means of the N1 interface is provided. In addition, in the CM-CONNECTED state, the UE may also have an N2 interface connection (N2 connection) and/or an N3 interface connection (N3 connection).

Furthermore, in connection management, management may be performed separately in a CM state over 3GPP access and in a CM state over non-3GPP access. In this case, the CM state over 3GPP access may include a non-connected state over 3GPP access (CM-IDLE state over 3GPP access) and a connected state over 3GPP access (CM-CONNECTED state over 3GPP access). Furthermore, the CM state over non-3GPP access may include a non-connected state over non-3GPP access (CM-IDLE state over non-3GPP access) and a connected state over non-3GPP access (CM-CONNECTED state over non-3GPP access). In addition, the non-connected state may also be implemented as an idle mode, and the connected state mode may also be implemented as a connected mode.

In addition, the CM state may also be implemented as a 5GMM mode. In this case, the non-connected state may also be implemented as a 5GMM non-connected mode (5GMM-IDLE mode), and the connected state may also be implemented as a 5GMM connected mode (5GMM-CONNECTED mode). Furthermore, the non-connected state over 3GPP access may also be implemented as a 5GMM non-connected mode over 3GPP access (5GMM-IDLE mode over 3GPP access), and the connected state over 3GPP access may also be implemented as a 5GMM connected mode over 3GPP access (5GMM-CONNECTED mode over 3GPP access). Furthermore, the non-connected state over non-3GPP access may also be implemented as a 5GMM non-connected mode over non-3GPP access (5GMM-IDLE mode over non-3GPP access), and the connected state over non-3GPP access may also be implemented as a 5GMM connected mode over non-3GPP access (5GMM-CONNECTED mode over non-3GPP access). In addition, the 5GMM non-connected mode may also be implemented as the idle mode, and the 5GMM connected mode may also be implemented as the connected mode.

In addition, one or more AMFs may be provided in the core network_B. In addition, the AMF may also be an NF managing one or more Network Slice Instances (NSIs). In addition, the AMF may also be a common CP function (common Control Plane Network Function (CPNF), or CCNF) shared among a plurality of NSIs.

In addition, if the UE is connected to the 5GS by means of the non-3GPP access, then the N3 IWF is a device and/or a function provided between the non-3GPP access and the 5GCN.

[2.4 Device Structure of SMF]

Next, an example of the device structure of the SMF is described with reference to FIG. 5. The SMF consists of a control portion_B700, a network connection portion_B720, and a storage portion_B740. The control portion_B700, the network connection portion_B720, and the storage portion_B740 are connected to each other by means of a bus. The SMF may also be a node for operating the control plane.

The control portion_B700 is a functional portion for controlling overall operations and functions of the SMF. The control portion_B700 reads and executes various programs stored in the storage portion_B740 according to requirements so as to achieve various processing in the SMF.

The network connection portion_B720 is a functional portion for connecting the SMF to the AMF and/or the UPF and/or the PCF and/or the UDM. That is, the SMF can use the network connection portion_B720 to receive and transmit user data and/or control information from/to the AMF and/or the UPF and/or the PCF and/or the UDM.

Detailed description is provided with reference to FIG. 2. The SMF in the 5GCN can use the network connection portion_A620 to communicate with the AMF by means of the N11 interface, communicate with the UPF by means of an N4 interface, communicate with the PCF by means of an N7 interface, and communicate with the UDM by means of an N10 interface.

The storage portion_B740 is a functional portion for storing programs, user data, control information, etc., required by the operations of the SMF.

The SMF has the following functions: session management functions such as establishment, modification, and release of a PDU session, a function for IP address allocation and management for the UE, a function for UPF selection and control, a UPF configuration function for routing traffic to an appropriate destination (transmission destination), an SM function to receive and transmit NAS messages, a function for downlink data arrival notification, a function to provide AN-specific SM information (of each AN) transmitted to the AN by means of the N2 interface and the AMF, a function to determine a Session and Service Continuity (SSC) mode for a session, a roaming function, etc.

[2.5 Device Structure of UPF]

Next, an example of the device structure of the UPF is described with reference to FIG. 5. The UPF consists of a control portion_B700, a network connection portion_B720, and a storage portion_B740. The control portion_B700, the network connection portion_B720, and the storage portion_B740 are connected to each other by means of a bus. The UPF may also be a node for operating the control plane.

The control portion_B700 is a functional portion for controlling overall operations and functions of the UPF. The control portion_B700 reads and executes various programs stored in the storage portion_B740 according to requirements so as to achieve various processing in the UPF.

The network connection portion_B720 is a functional portion for connecting the UPF to the base station device (gNB) and/or the SMF and/or the DN in the 5G AN. That is, the UPF can use the network connection portion_B720 to receive and transmit user data and/or control information from/to the base station device (gNB) and/or the SMF and/or the DN in the 5G AN.

Detailed description is provided with reference to FIG. 2. The UPF in the SGCN can use the network connection portion_A620 to communicate with the gNB by means of the N3 interface, communicate with the SMF by means of the N4 interface, communicate with the DN by means of an N6 interface, and communicate with the other UPFs by means of an N9 interface.

The storage portion_B740 is a functional portion for storing programs, user data, control information, etc., required by the operations of the UPF.

The UPF has the following functions: a function to serve as an anchor point for intra-RAT mobility or inter-RAT mobility, a function to serve as an external PDU session point connected to the DN (namely, a function to serve as a gateway between the DN and the core network_B to forward user data), a function to route and forward packets, an Uplink Classifier (ULCL) function supporting routing of a plurality of traffic flows for one DN, a branching point function supporting a multi-homed PDU session, a Quality of Service (QoS) processing function for the user plane, a function to authenticate uplink traffic, a function to trigger buffering of downlink packets or trigger downlink data notification, etc.

In addition, the UPF may also be a gateway for IP communication and/or non-IP communication. In addition, the UPF may also have a function of forwarding an IP communication, and may also have a function of performing conversion between a non-IP communication and an IP communication. Furthermore, the plurality of gateways provided may also be gateways connecting the core network B to a single DN. In addition, the UPF may also have connectivity to other NFs, and may also be connected to each device by means of other NFs.

In addition, the user plane is user data received and transmitted between the UE and the network. The user plane may also be received and transmitted by using a PDN connection or a PDU session. Furthermore, in the EPS, the user plane may also be received and transmitted by using the LTE-Uu interface and/or an S1-U interface and/or an S5 interface and/or an S8 interface and/or an SGi interface. Furthermore, in the 5GS, the user plane may also be received and transmitted by using an interface between the UE and the NGRAN and/or the N3 interface and/or the N9 interface and/or the N6 interface. Hereinafter, the user plane may also be implemented as a U-Plane.

Furthermore, the control plane is a control message received and transmitted for communication control of the UE and the like. The control plane may also be received and transmitted by using a Non-Access-Stratum (NAS) signaling connection between the UE and the MME. Furthermore, in the EPS, the control plane may also be received and transmitted by using the LTE-Uu interface and an S1-MME interface. Furthermore, in the 5GS, the control plane may also be received and transmitted by using the interface between the UE and the NGRAN and the N2 interface.

Hereinafter, the control plane may also be implemented as a control plane, or may also be implemented as a C-Plane.

Furthermore, the User Plane (U-Plane, or UP) may also be a communication path for receiving and transmitting user data, and may also consist of a plurality of bearers. Furthermore, the Control Plane (C-Plane, or CP) may also be a communication path for receiving and transmitting control messages, and may also consist of a plurality of bearers.

[2.6 Description for Other Devices and/or Functions]

Next, description for other devices and/or functions is provided.

The PCF has a function of providing a policy rule and the like.

In addition, the UDM has an authentication credential processing function, a user identification processing function, an access authentication function, a registration/mobility management function, a subscriber information management (subscription management) function, etc.

In addition, the PCRF is connected to the PGW and/or the PDN, and has a function of performing QoS management on data distribution, etc. For example, QoS management is performed on the communication path between the UE_A10 and the PDN. Furthermore, the PCRF may also be a device for formulating and/or managing a Policy and Charging Control (PCC) rule and/or a routing rule used by each device during reception and transmission of user data.

In addition, the HSS is connected to the MME and/or the SCEF, and has a function of managing subscriber information and the like. The subscriber information of the HSS is referred to during, for example, access control of the MME. Furthermore, the HSS may also be connected to a location management device different from the MME.

In addition, the SCEF is connected to the DN and/or the PDN, the MME, and the HSS, and has a function of serving as a relay device, etc.; the relay device serves as a gateway connecting the DN and/or the PDN to the core network_A so as to forward user data. In addition, the SCEF is a gateway for non-IP communication. Furthermore, the SCEF may also have the function of performing conversion between non-IP communication and IP communication. In addition, a plurality of such gateways may be provided in the core network_A. The SCEF may be configured to be located outside the core network, or may be configured to be located in the core network.

3. Description for Terms, Identification Information, and Procedures Used in Each Embodiment Description for at least one term, at least one piece of identification information, and at least one procedure used in each embodiment is provided in advance.

3.1 Description for Terms and Identification Information Used in Each Embodiment Firstly, description for highly technical terms used in each embodiment or identification information used in the procedure are provided in advance.

The so-called network refers to at least part of the access network_B, the core network_B, and the DN. In addition, one or more devices included in at least part of the access network_B, the core network_B, and the DN may also be referred to as networks or network devices. That is, so-called the network executing reception and transmission and/or processing of a message may also refer to that the device (the network device and/or the control device) in the network executes reception and transmission and/or processing of a message. Conversely, so-called the device in the network executing reception and transmission and/or processing of a message may also refer to that the network executes reception and transmission and/or processing of a message.

In addition, the Session Management (SM) message (also referred to as a Non-Access-Stratum (NAS) SM message) may be a NAS message used by a procedure for SM, and may also be a control message received and transmitted between the UE_A10 and an SMF_A230 by means of an AMF_A240. Furthermore, the SM message may also include a PDU session establishment request message, a PDU session establishment accept message, a PDU session complete message, a PDU session reject message, a PDU session modification request message, a PDU session modification accept message, a PDU session modification response message, etc. In addition, the procedure for SM may also include a PDU session establishment procedure.

In addition, a 5G System (5GS) service may also be a connection service provided by using a core network_B190. Furthermore, the 5GS service may be a service different from an EPS service, or may also be a service the same as the EPS service.

In addition, a non 5GS service may also be a service other than a 5GS service, and may also include the EPS service and/or a non EPS service.

In addition, if the UE_A10 can use the N1 mode and an S1 mode, then a single registration mode is a mode in which a common registration state is maintained for the 5GMM state and an EMM state.

In addition, if the UE_A10 can use the N1 mode and the S1 mode, then a dual registration mode is a mode in which the registration state is maintained independently for the 5GMM state and the EMM state. In addition, in the dual registration mode, the UE_A10 may be registered with the network only in the N1 mode (namely, registered with only the 5GC), or may be registered with the network only in the S1 mode (namely, registered with only the EPC), or may also be registered with the network in both the N1 mode and the S1 mode (registered with both the 5GC and the EPC).

In addition, in order to achieve interworking between the 5GS and the EPC, UE supporting both the 5GC and the EPC NAS can operate in the single registration mode or the dual registration mode.

In addition, the S1 mode is a mode in which access to the EPC performed by means of the E-UTRAN for the UE_A10 is allowed. In other words, the S1 mode may also be a mode in which an S1 interface is used to perform message reception and transmission. In addition, the S1 interface may also consist of the S1-MME interface and the S1-U interface.

In addition, the N1 mode is a mode in which access to the 5GC performed by means of the 5G access network for the UE_A10 is allowed. In other words, the N1 mode may also be a mode in which the N1 interface is used to perform message reception and transmission.

In addition, an Access Point Name (APN) may also be identification information for identifying external networks such as the core network and/or the PDN. Furthermore, the APN may also be used as information for selecting gateways such as a PGW_A30/UPF_A235 for providing a connection to a core network A_90.

In addition, the so-called Packet Data Network (PDN) type refers to a type of the PDN connection, including IPv4, IPv6, IPv4v6, and non-IP. If the type is specified as IPv4, then it is indicated that IPv4 is used for data reception and transmission. If the type is specified as IPv6, then it is indicated that IPv6 is used for data reception and transmission. If the type is specified as IPv4v6, then it is indicated that IPv4 or IPv6 is used for data reception and transmission. If the type is specified as non-IP, then it is indicated that IP communication is not used, but a communication method other than IP communication is used.

In addition, the so-called Protocol Data Unit/Packet Data Unit (PDU) session can be defined as relevance between the DN providing a PDU connectivity service and the UE, but may also be defined as connectivity established between the UE and the external gateway. The UE establishes, in the 5GS, a PDU session via the access network_B and the core network_B, so that the UE can use the PDU session to receive and transmit user data from/to the DN. Here, the so-called external gateway may also be the UPF, the SCEF, etc. The UE can use the PDU session to receive and transmit user data from/to devices such as an application server provided in the DN.

In addition, each device (the UE and/or the access network device and/or the core network device) can correspondingly manage one or more pieces of identification information for the PDU session. In addition, these pieces of identification information may also include one or more of a DNN, a QoS rule, a PDU session type, application identification information, NSI identification information, access network identification information, and an SSC mode, or may further include other pieces of information. Furthermore, if a plurality of PDU sessions are established, then identification information corresponding to the PDU sessions may have the same content, or may have different content.

In addition, the Data Network Name (DNN) may be identification information for identifying external networks such as the core network and/or the DN. Furthermore, the DNN may also be used as information for selecting gateways such as the PGW_A30/UPF_A235 for providing a connection to a core network B190. Furthermore, the DNN may also be equivalent to the Access Point Name (APN).

In addition, the Protocol Data Unit/Packet Data Unit (PDU) session type refers to the type of the PDU session, including IPv4, IPv6, Ethernet, and Unstructured. If the type is specified as IPv4, then it is indicated that IPv4 is used for data reception and transmission. If the type is specified as IPv6, then it is indicated that IPv6 is used for data reception and transmission. If the type is specified as Ethernet, then it is indicated that Ethernet frame reception and transmission is performed. In addition, Ethernet may also indicate that IP communication is not performed. If the type is specified as Unstructured, then it is indicated that Point-to-Point (P2P) tunneling technology is used to receive and transmit data from/to the application server and the like in the DN. The P2P tunneling technology includes, for example, UDP/IP encapsulation technology, which may also be used. In addition, the PDU session type may also include IP in addition to the types described above. The type can be specified as IP if the UE can use both IPv4 and IPv6.

In addition, the so-called Network Slice (NS) is a logical network providing specific network capabilities and network characteristics. The UE and/or the network can support the Network Slice (NS) in the 5GS.

In addition, the so-called Network Slice Instance (NSI) consists of an instance (entity) of a Network Function (NF) and a set of necessary resources to form a configured network slice. Here, the so-called NF is a processing function of the network, and is used or defined by 3GPP. The NSI is an entity consisting of one or more NSs and provided in the core network_B. In addition, the NSI may also consist of a virtual Network Function (NF) generated by using a Network Slice Template (NST). Here, the NST is associated with a resource request for providing a required communication service or capability, and is a logical presentation of one or more NFs. That is, the so-called NSI may also be an aggregation consisting of a plurality of NFs in the core network_B190. In addition, the NSI may also be a logical network configured to separate user data delivered by means of a service and the like. One or more NFs are provided in an NS. The NF provided in the NS may or may not be a device shared with another NS. The UE and/or the devices in the network can be allocated to one or more NSs on the basis of registration information such as NSSAI and/or S-NSSAI and/or a UE usage type and/or one or more NSI IDs and/or the APN. In addition, the UE usage type is a parameter value included in the registration information of the UE and for identifying the NSI. The UE usage type may also be stored in the HSS. The AMF may also be replaced with the SMF and the UPF on the basis of the UE usage type.

In addition, Single Network Slice Selection Assistance Information (S-NSSAI) is information for identifying the NS. The S-NSSAI may consist of only a Slice/Service Type (SST), or may consist of both the SST and a Slice Differentiator (SD). Here, the so-called SST is information indicating an operation of the NS expected in terms of functions and services. In addition, the SD may also be information for interpolating the SST if one NSI is selected from a plurality of NSIs indicated by the SST. The S-NSSAI may be information unique to each PLMN, or may also be standard information common between PLMNs. In addition, the network may also store one or more pieces of S-NSSAI in the registration information of the UE as default S-NSSAI. In addition, if the S-NSSAI is the default S-NSSAI, and if the UE does not transmit valid S-NSSAI to the network in a registration request message, then the network may also provide an NS related to the UE.

In addition, Network Slice Selection Assistance Information (NSSAI) is a set of S-NSSAI. Each piece of S-NSSAI included in the NSSAI is information for assisting the access network or the core network to select an NSI. The UE may also store NSSAI allowed by the network for each PLMN. In addition, the NSSAI may also be information for selecting an AMF.

In addition, the Session and Service Continuity (SSC) mode refers to a mode indicating session and service continuity supported by the system and/or each device in the 5G system (5GS). More specifically, the SSC mode may also be a mode indicating a type of the session and service continuity supported by a PDU session established between the UE_A10 and the UPF. In addition, the SSC mode may also be a mode indicating a type of the session and service continuity configured for each PDU session. Furthermore, the SSC mode may also consist of an SSC mode 1, an SSC mode 2, and an SSC mode 3. In addition, the SSC mode corresponding to the PDU session may not be modified while the PDU session continues.

In addition, 5GMM-CONNECTED mode with RRC inactive indication is a state indicating the following situation: although an RRC layer is in an inactive state, the NAS layer is still in the connected state. In other words, the 5GMM-CONNECTED mode with RRC inactive indication is text for maintaining NAS signaling connection and/or NAS signaling connection, and is a state in which a radio bearer is released.

In addition, so-called support of the 5GMM-CONNECTED mode with RRC inactive indication may also refer to support for maintaining a status of the NAS layer to be the connected state even if a notification indicating that the RRC layer has become inactive is received from a lower layer.

Furthermore, so-called use of the 5GMM-CONNECTED mode with RRC inactive indication refers to still maintaining the status of the NAS layer to be the connected state even if a notification indicating that the RRC layer has become inactive is received from the lower layer.

A tracking area is a single or a plurality of ranges managed by the core network and represented by the location information of the UE_A10. The tracking area may consist of a plurality of units. Furthermore, the tracking area may be a range of control messages such as broadcast paging, or may also be a range in which the UE_A10 can move without performing a handover procedure. Furthermore, the tracking area may also be a routing area, or may also be a location area, or may be an area the same as these areas. Hereinafter, the tracking area may also be a Tracking Area (TA).

An A list is a list including one or more TAs allocated by the network to the UE_A10. In addition, the UE_A10 may be able to move without executing a tracking area update procedure while moving in one or more TAs included in the TA list. In other words, for the UE_A10, the TA list may also be an information group indicating an area in which the UE_A10 can move without executing the tracking area update procedure. In addition, the TA list may also be implemented as a TAI list consisting of one or more Tracking Area Identities (TAIs); hereinafter, the TAI list may also refer to the TA list.

The so-called Local Area Data Network (LADN) is a DN to which the UE can be connected only in a specific location, and provides connectivity for a specific DNN (namely, LADN DNN). The LADN may also be a DN that can be connected to in a specific location by using a PDU session corresponding to a specific DNN. Furthermore, the LADN may also be a DN that can be connected to in a specific location by using a PDU session corresponding to a combination of a specific DNN and specific S-NSSAI.

LADN information is information associated with the LADN. The LADN information may also be information indicating a specific LADN that can be used by the UE. The LADN information may also include the LADN DNN and LADN service area information. More specifically, the LADN information may also include one or more pieces of information for each LADN (hereinafter referred to as information indicating the LADN). Furthermore, the information indicating the LADN may also include the LADN DNN and the LADN service area information. Here, the LADN DNN may also be information for identifying the LADN, or may be information for identifying a DN operating as the LADN, or may be a DNN used during establishment of a PDU session for the LADN.

In addition, if the LADN information is existing LADN information, then the LADN information may also be information about the described structure. Specifically, if the LADN information is the existing LADN information, then an LADN service area may also be an existing LADN service area.

Conversely, if the LADN information is extended LADN information, then the LADN information may also be part of extended information about the described structure. Specifically, if the LADN information is the extended LADN information, then the LADN service area may also be an extended LADN service area. Furthermore, if the LADN information is the extended LADN information, then the information indicating the LADN may further include information indicating a valid period of the LADN service area and/or information indicating the granularity of the LADN service area. Furthermore, if the LADN information is the extended LADN information, then the information indicating the LADN may further include the S-NSSAI.

The LADN service area is an area in which a PDU session for the LADN can be established. The LADN service area may also be an area in which a connection can be established to the LADN. Furthermore, the LADN service area may also be an area represented by the LADN service area information. Here, the LADN service area information may also be information for identifying the LADN service area, may also be provided as a set of tracking areas, or may also be provided as a Tracking Area Identity (TAI) list.

In addition, if the LADN service area is an existing LADN service area, then the LADN service area may also be an area consisting of tracking areas belonging to a registration area to which current UE is connected. In other words, if the LADN service area is the existing LADN service area, then the LADN service area may also be an area consisting of one or more tracking areas. Conversely, if the LADN service area is an extended LADN service area, then the LADN service area may be an area consisting of the tracking area, or may also be an area covered by part of base stations in the tracking area. Furthermore, if the LADN service area is the extended LADN service area, then the LADN service area may be an area having a size other than the size of the area consisting of the tracking area, or may also be an area not dependent on any tracking area. In other words, if the LADN service area is the extended LADN service area, then the LADN service area may be an area consisting of one or more tracking areas, or may be an area different from the area consisting of one or more tracking areas.

Furthermore, if the LADN service area is the area consisting of one or more tracking areas, then the LADN service area information may be a tracking area ID list consisting of one or more tracking area IDs. Conversely, if the LADN service area is the area different from the area consisting of one or more tracking areas, then the LADN service area information may be information requiring assistance from a Radio Access Network (RAN), or may also be information not requiring any assistance from the RAN. Here, the information requiring assistance from the RAN may be unit information, or may also be base station information. Furthermore, the information requiring assistance from the RAN may be a unit ID, or may also be a base station ID. Furthermore, the information requiring assistance from the RAN is not limited thereto, and may also be information defined by the RAN. Furthermore, the information not requiring any assistance from the RAN may be physical location information, or may also be location information that can be acquired by means of an application. Furthermore, the information not requiring any assistance from the RAN is not limited thereto, and may also be information that can be acquired by means other than the RAN. Here, the RAN may also be implemented as an access network. Conversely, the access network may also be referred to as a RAN.

The so-called extension of the LADN service area may also refer to using an LADN service area having a granularity different from the granularity of the existing LADN service area. Furthermore, the so-called extension of the LADN service area may also refer to using extended LADN information different from the existing LADN information. Furthermore, the so-called extension of the LADN service area may also refer to connecting to an extended LADN different from the existing LADN.

That is, if all of the devices support extension of the LADN service area, then in addition to the existing LADN service area, an extended LADN service area different from the existing LADN service area can also be adapted to. Furthermore, if all of the devices support extension of the LADN service area, then in addition to the existing LADN information, extended LADN information different from the existing LADN information can also be used. Furthermore, if all of the devices support extension of the LADN service area, then in addition to the existing LADN, an extended LADN different from the existing LADN can also be connected to.

Conversely, if part of the devices do not support extension of the LADN service area, then the extended LADN service area may not be adapted to, and only the existing LADN service area can be adapted to. Furthermore, if part of the devices do not support extension of the LADN service area, then the extended LADN information may not be used, and only the existing LADN information can be used. Furthermore, if part of the devices do not support extension of the LADN service area, then the extended LADN may not be connected to, and only the existing LADN can be connected to.

In addition, if all of the devices support utilization restriction imposed on extension of the LADN service area, then the extended LADN service area may not be adapted to, and only the existing LADN service area can be adapted to. Furthermore, if all of the devices support utilization restriction imposed on extension of the LADN service area, then the extended LADN information may not be used, and only the existing LADN information can be used. Furthermore, if all of the devices support utilization restriction imposed on extension of the LADN service area, then the extended LADN may not be connected to, and only the existing LADN can be connected to.

Conversely, if none of the devices supports utilization restriction imposed on extension of the LADN service area, then the extended LADN service area may also be adapted to. Furthermore, if none of the devices supports utilization restriction imposed on extension of the LADN service area, then the extended LADN information may also be used. Furthermore, if none of the devices supports utilization restriction imposed on extension of the LADN service area, then the extended LADN may also be connected to.

A PDU session for LADN is a PDU session corresponding to a DNN associated with the LADN. The PDU session for LADN may also be a PDU session established for the LADN. In other words, the PDU session for LADN may be a PDU session established between the UE and the LADN, or may also be a PDU session for user data communication between the UE and the LADN. In addition, the PDU session for LADN may also be a PDU session that can be established only in the LADN service area. In other words, in a specific location, the UE can establish a PDU session for LADN by using a specific DNN. Furthermore, in other words, in a specific location, the UE can establish a PDU session for LADN by using a combination of a specific DNN and specific S-NSSAI.

1-st identification information is information indicating whether the UE supports extension of the LADN service area. The 1-st identification information may be a bit indicating that extension of the LADN service area is supported, or may be a bit indicating that extension of the LADN service area is not supported.

In addition, the 1-st identification information may also be information indicating whether the UE supports utilization restriction imposed on extension of the LADN service area. Furthermore, the 1-st identification information may be a bit indicating that utilization restriction imposed on extension of the LADN service area is supported, or may be a bit indicating that utilization restriction imposed on extension of the LADN service area is not supported.

Furthermore, the 1-st identification information may also be information selected and determined on the basis of UE capability information and/or UE configurations and/or a UE status and/or a user policy and/or an application request.

2-nd identification information is an LADN indication. The 2-nd identification information is information indicating a request for the LADN information. The 2-nd identification information may also be information indicating whether to request the LADN information. Furthermore, the 2-nd identification information may also be information indicating a requested LADN DNN. Furthermore, the 2-nd identification information may also be information indicating a requested LADN service area.

Furthermore, the 2-nd identification information may be information indicating a request for updating the LADN information, or may be information indicating updated LADN information. Furthermore, the 2-nd identification information may also be information indicating a request for deleting the LADN information.

Furthermore, the 2-nd identification information may also be an information element including the LADN indication. Furthermore, the information element including the LADN indication may also be an LADN indication information element. In addition, the LADN indication information element may also include one or more LADN DNNs. Conversely, the LADN indication information element may also be an information element not including any LADN DNN. In other words, the LADN indication information element may also be an information element not including any specific LADN DNN.

Furthermore, the 2-nd identification information may also be a bit indicating the capability of the UE in 5G and constituting a 5GMM capability information element. Furthermore, the 2-nd identification information may also be information selected and determined on the basis of the UE capability information and/or the UE configurations and/or the UE status and/or the user policy and/or the application request.

11-th identification information is information indicating whether the network supports extension of the LADN service area. The 11-th identification information may be a bit indicating that extension of the LADN service area is supported, or may be a bit indicating that extension of the LADN service area is not supported.

In addition, the 11-th identification information may also be information indicating whether the network supports utilization restriction imposed on extension of the LADN service area. Furthermore, the 11-th identification information may be a bit indicating that utilization restriction imposed on extension of the LADN service area is supported, or may be a bit indicating that utilization restriction imposed on extension of the LADN service area is not supported.

Furthermore, the 11-th identification information may also be a bit indicating the capability of the network in 5G and constituting a 5GS network feature support information element. Furthermore, the 11-th identification information may also be information selected and determined by means of the network and on the basis of the received 1-st identification information and/or information corresponding to the DN and/or information corresponding to the NSI and/or network capability information and/or an operator policy and/or the network status and/or user registration information, etc. Furthermore, the 11-th identification information may also be information selected and determined on the basis of other pieces of identification information selected by the network in this procedure.

12-th identification information is LADN information. The 12-th identification information may be LADN information allowed by the network, or may be valid LADN information. Furthermore, the 12-th identification information may also be information received and transmitted if an LADN service area exists in the registration area to which the UE is connected.

Furthermore, if the 1-st identification information and/or the 11-th identification information are information indicating that extension of the LADN service area is supported, then the 12-th identification information may also be extended LADN information different from the existing LADN information. Conversely, if the 1-st identification information and/or the 11-th identification information are information indicating that extension of the LADN service area is not supported, then the 12-th identification information may also be the existing LADN information.

In addition, if the 1-st identification information and/or the 11-th identification information are information indicating that utilization restriction imposed on extension of the LADN service area is supported, then the 12-th identification information may be the existing LADN information. Conversely, if the 1-st identification information and/or the 11-th identification information are information indicating that utilization restriction imposed on extension of the LADN service area is not supported, then the 12-th identification information may also be extended LADN information different from the existing LADN information.

Furthermore, the 12-th identification information may also be information selected and determined by means of the network and on the basis of the received identification information and/or the information corresponding to the DN and/or the information corresponding to the NSI and/or the network capability information and/or the operator policy and/or the network status and/or the user registration information, etc. Furthermore, the 12-th identification information may also be information selected and determined on the basis of other pieces of identification information selected by the network in this procedure. Furthermore, the 12-th identification information may also be an information element including the LADN information. Furthermore, the information element including the LADN information may also be an LADN message information element. In addition, the LADN message information element may also include one or more LADN DNNs.

13-th identification information is information indicating the granularity of the LADN service area. The 13-th identification information may also be information indicating the size of the LADN service area. Furthermore, the 13-th identification information can be received and transmitted in correspondence with the 12-th identification information, or may also be received and transmitted in correspondence with information for each LADN included in the 12-th identification information (hereinafter referred to as information indicating LADN). Furthermore, the 13-th identification information may also be received and transmitted for each piece of information indicating LADN. In this case, the 13-th identification information may be different from each piece of information indicating LADN, or may also be the same as a plurality of pieces of information indicating LADN.

In addition, if the 13-th identification information is received and transmitted in correspondence with the information indicating LADN, then the 13-th identification information may also be information indicating the granularity of the LADN service area information (hereinafter referred to as LADN service area information), and the LADN service area information is included in the information indicating LADN.

For example, the 13-th identification information may also be information indicating that an area consisting of one or more tracking areas is used as the LADN service area. In this case, the LADN service area information may also be provided with a tracking area ID list consisting of one or more tracking area IDs.

Furthermore, the 13-th identification information may also be information indicating that an area different from the area consisting of one or more tracking areas is used as the LADN service area. In this case, the LADN service area information may be provided with information requiring assistance from the RAN, or may be provided with information not requiring any assistance from the RAN.

Furthermore, the 13-th identification information may also be information indicating that an area covered by part of the base stations in the tracking area is used as the LADN service area. In this case, the LADN service area information may also be provided with a unit ID and/or a unit ID list consisting of one or more unit IDs.

Furthermore, the 13-th identification information may also be information indicating that an area configured to be not dependent on any tracking area is used as the LADN service area. In this case, the LADN service area information may also be provided with physical location information.

Here, if the 13-th identification information is not received and transmitted and/or if the 13-th identification information is invalid information, then the area consisting of one or more tracking areas can also be used as the LADN service area. Furthermore, the LADN service area information may also be provided with a tracking area ID list consisting of one or more tracking area IDs. In addition, the granularity indicated by the 13-th identification information and/or the LADN service area information is not limited thereto.

Furthermore, the 13-th identification information may also be information selected and determined by means of the network and on the basis of the received 1-st identification information and/or the information corresponding to the DN and/or the information corresponding to the NSI and/or the network capability information and/or the operator policy and/or the network status and/or the user registration information, etc. Furthermore, the 13-th identification information may also be information selected and determined on the basis of other pieces of identification information selected by the network in this procedure.

The 14-th identification information is information indicating a valid period of the LADN service area. The 14-th identification information may also be information indicating whether the LADN service area is currently valid. Furthermore, the 14-th identification information can be received and transmitted in correspondence with the 12-th identification information, or may also be received and transmitted in correspondence with information for each LADN included in the 12-th identification information (hereinafter referred to as information indicating LADN). Furthermore, the 14-th identification information may also be received and transmitted for each piece of information indicating LADN. In this case, the 14-th identification information may be different from each piece of information indicating LADN, or may also be the same as a plurality of pieces of information indicating LADN.

Here, the so-called information indicating the valid period of the LADN service area may be information indicating valid time of the LADN service area, or may also be information indicating a period indicated by a specific date and time. Furthermore, the information indicating the valid period of the LADN service area may be information indicating a specific time period, or may also be information indicating a specific day of a week. Furthermore, the information indicating the valid period of the LADN service area may be information indicating a specific day, or may also be information indicating a specific week. Furthermore, the information indicating the valid period of the LADN service area may be information indicating a specific month, or may also be information indicating a specific year.

Here, if the 14-th identification information is not received and transmitted and/or if the 14-th identification information is invalid information, then the valid period of the LADN service area may also be a period ending at a time point when the LADN information and/or the information indicating LADN is updated. In addition, the information indicating the valid period of the LADN service area may not be limited thereto.

Furthermore, the 14-th identification information may also be information selected and determined by means of the network and on the basis of the received 1-st identification information and/or the information corresponding to the DN and/or the information corresponding to the NSI and/or the network capability information and/or the operator policy and/or the network status and/or the user registration information, etc. Furthermore, the 14-th identification information may also be information selected and determined on the basis of other pieces of identification information selected by the network in this procedure.

26-th identification information is information indicating the DNN. The 26-th identification information may also be information indicating the DNN requested by the UE. More specifically, the 26-th identification information may also be information indicating the DNN requested by the UE and corresponding to the PDU session established in this procedure. Furthermore, the 26-th identification information may also be information selected and determined on the basis of one or more of the 11-th identification information to the 17-th identification information received and transmitted and/or the UE configurations and/or the UE status and/or the user policy and/or the application request.

In addition, 36-th identification information is information indicating the DNN. The 36-th identification information may also be information indicating the DNN selected by the network. More specifically, the 36-th identification information may also be information indicating the DNN selected by the network and corresponding to the PDU session established in this procedure.

Furthermore, the 36-th identification information may also be information selected and determined by means of the network and on the basis of the received 36-th identification information and/or the information corresponding to the NSI and/or the network capability information and/or the operator policy and/or the network status and/or the user registration information, etc. Furthermore, the 36-th identification information may also be information selected and determined on the basis of other pieces of identification information selected by the network in this procedure.

Furthermore, 41-st identification information is a cause value indicating a reason as to why the request of the UE is not allowed. The 41-st identification information may be a 5GS Session Management (5GSM) cause value. Furthermore, the 41-st identification information may be information indicating that the UE is located outside the LADN service area. Furthermore, the 41-st identification information may also be the following information, namely, information used by the network in order to indicate that the UE is located outside the LADN service area.

Furthermore, the 41-st identification information 41-st identification information may also be information indicating that the requested LADN is not allowed in an area to which the UE currently belongs. In addition, the so-called area to which the UE currently belongs may be an area consisting of one or more tracking areas, or may also be an LADN service area corresponding to the LADN DNN.

Furthermore, the 41-st identification information may also be information selected and determined by means of the network and on the basis of the identification information received from the UE and/or the network capability information and/or the operator policy and/or the network status and/or the user registration information and/or the area to which the UE currently belongs, etc.

Furthermore, the 41-st identification information may also be a No. 46 5GSM cause value indicating being out of the LADN service. In other words, the 41-st identification information may also be 5GSM cause #46 "out of LADN service area." In addition, 5GSM cause #46 "out of LADN service area" may also be a cause value indicating that the UE is out of the LADN service.

Furthermore, the 41-st identification information may also be a 5GS Mobility Management (5GMM) cause value. Furthermore, the 41-st identification information may also be information used when the AMF cannot forward to the SMF the SM messages such as the PDU session establishment request message and the like received from the UE.

3.2 Description for Procedures Used in Each Embodiment

Next, description for procedures used in each embodiment is provided. In addition, the procedures used in each embodiment include a registration procedure, a PDU session establishment procedure, and a UE configuration update procedure (generic UE configuration update procedure). Next, description for each procedure is provided.

In addition, in each embodiment, a case in which an HSS and a UDM, a PCF and a PCRF, an SMF and a PGW-C, and a UPF and a PGW-U are each configured to be the same device (namely, the same physical hardware, or the same logical hardware, or the same software) as illustrated in FIG. 2 is used as an example for description. However, the contents disclosed in this embodiment can also be applied to a case in which these devices are configured to be different devices (namely, different physical hardware, or different logical hardware, or different software). For example, these devices may receive and transmit data directly, or may receive and transmit data by means of the N26 interface between the AMF and the MME, or may receive and transmit data by means of the UE.

3.2.1 Registration Procedure

Figure 6:
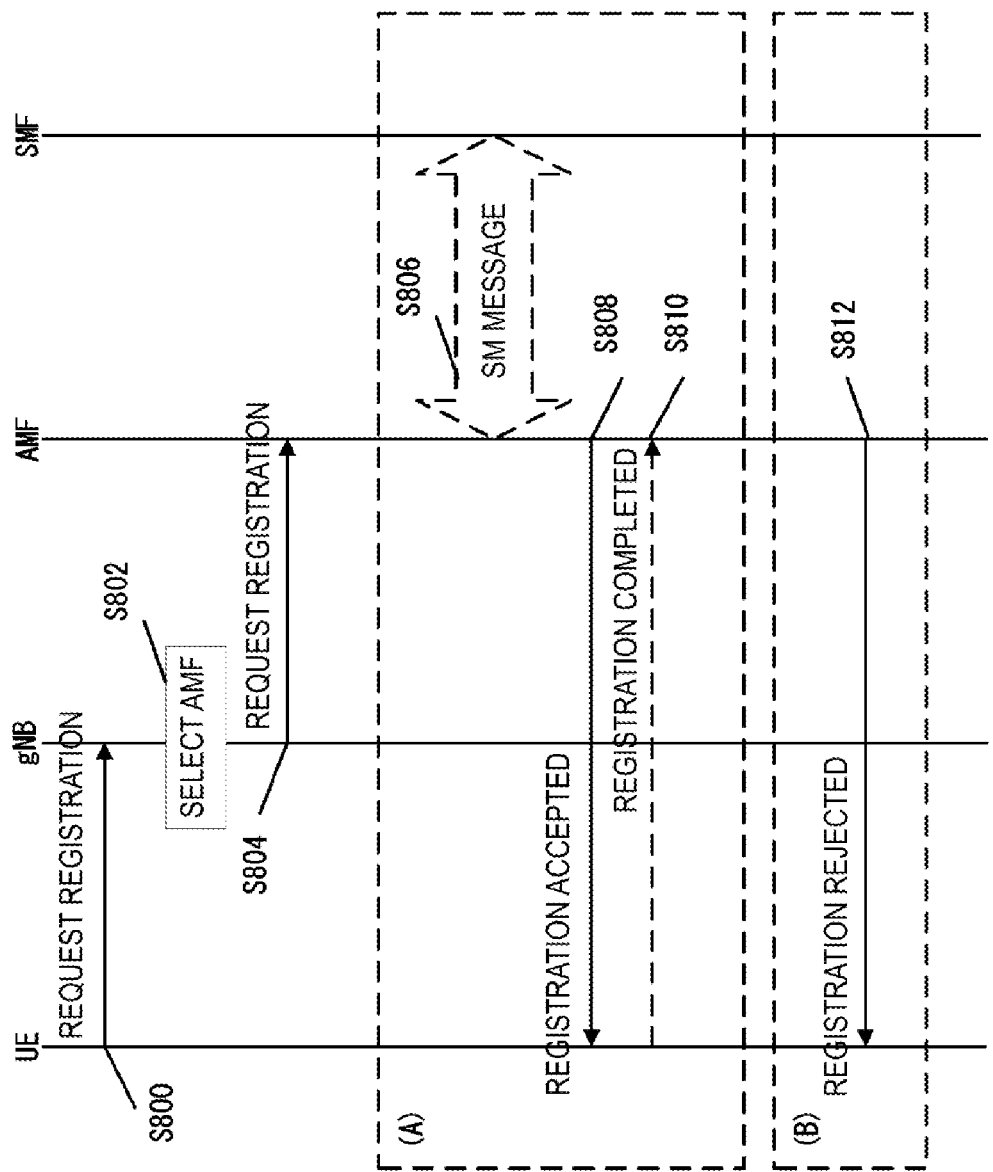
FIG. 6 is a diagram illustrating a registration procedure.

Firstly, description for the registration procedure is provided with reference to FIG. 6. The registration procedure is a procedure in the 5GS. Hereinafter, so-called this procedure refers to the registration procedure. The registration procedure is a procedure initiated by the UE for registration with the access network_B and/or the core network B and/or the DN. If the UE is not registered with the network, then the UE can execute this procedure at any timing such as a timing when power is turned on. In other words, if the UE is in the non-registered state (RM-DEREGISTERED state), then the UE can initiate this procedure at any timing. In addition, each device (especially the UE and the AMF) can transition to the registration state (RM-REGTSTERED state) on the basis of completion of the registration procedure.

Furthermore, the registration procedure is a procedure for updating location registration information of the UE in the network and/or periodically notifying the network of the UE status from the UE and/or updating a specific parameter related to the UE in the network.

The UE may also initiate the registration procedure when moving across a TA. In other words, the UE may also initiate the registration procedure when the UE moves to a TA different from TAs included in a TA list stored by the UE. Furthermore, the UE may also initiate this procedure when a running timer expires. Furthermore, the UE may also initiate the registration procedure when text of each device needs to be updated due to disconnection or invalidation of the PDU session. Furthermore, the UE may also initiate the registration procedure when capability information and/or a preference related to PDU session establishment of the UE have changed. Furthermore, the UE may also initiate the registration procedure periodically. Furthermore, the UE may also initiate the registration procedure on the basis of completion of the UE configuration update procedure. In addition, the embodiment is not limited to the above, and the UE can execute the registration procedure at any timing.

Furthermore, even if the UE is in the registered state, the UE may also initiate the registration procedure periodically. In other words, the UE may also initiate the registration procedure on the basis of expiration of the timer. Furthermore, the UE may also initiate the registration procedure in a state in which the LADN information is stored therein. Furthermore, the UE may also initiate the registration procedure in a state in which a PDU session is established. In addition, the PDU session may be a PDU session corresponding to the LADN information, or may also be a PDU session for LADN. Furthermore, the PDU session may also be a PDU session corresponding to the NSSAI.

In addition, a registration procedure executed on the basis of movement of the UE and a registration procedure executed periodically may also be implemented as a registration procedure for movement and registration update. In other words, the registration procedure for movement and registration update may be a registration procedure executed on the basis of movement of the UE, or may also be a registration procedure executed periodically. Furthermore, the registration procedure for movement and registration update may also be a registration procedure executed on the basis of configuration update of the UE. Furthermore, the registration procedure for movement and registration update may also be a registration procedure executed for the purpose of establishing a communication path for receiving and transmitting user data. Furthermore, the registration procedure for movement and registration update may also be a registration procedure executed on the basis of a request from the network. Furthermore, in other words, the registration procedure for movement and registration update may be a registration procedure other than an initial registration procedure. Hereinafter, the registration procedure for movement and registration update may also be implemented as this procedure.

Next, description for each step of the registration procedure is provided. In addition, the registration procedure described below may be the initial registration procedure, or may also be the registration procedure for movement and registration update.

Firstly, the UE initiates the registration procedure by transmitting to the AMF a registration request message (S800) (S802) (S804). Specifically, the UE transmits an RRC message including the registration request message to the 5G AN (or gNB) (S800). In addition, the registration request message is a NAS message. In addition, the RRC message may also be a control message received and transmitted between the UE and the 5G AN (or gNB). In addition, the NAS message is processed by the NAS layer, and the RRC message is processed by the RRC layer. In addition, the NAS layer is a layer higher than the RRC layer.

Here, the UE can include at least one or more of the 1-st identification information to the 2-nd identification information in the registration request message and/or the RRC message, and then transmit the same; however, the UE can also include at least one or more of the 1-st identification information to the 2-nd identification information in a control message different from the above messages such as in a control message of a layer (such as a MAC layer, an RLC layer, and a PDCP layer) lower than the RRC layer, and then transmit the same. In addition, the UE may transmit these pieces of identification information to indicate that the UE supports various functions or to indicate the request of the UE. Furthermore, if a plurality of pieces of identification information are received and transmitted, then two or more pieces of identification information of these pieces of identification information may also form one or more pieces of identification information. In addition, information indicating that each function is supported and information indicating a request for using each function may be received and transmitted as the same identification information, or may be received and transmitted as different identification information.

If the UE supports extension of the LADN service area, then information indicating that extension of the LADN service area is supported may be configured to be the 1-st identification information, or the 1-st identification information indicating that extension of the LADN service area is supported may also be included in the registration request message and then transmitted. Conversely, if the UE does not support extension of the LADN service area, then information indicating that extension of the LADN service area is not supported may be configured to be the 1-st identification information, or the 1-st identification information indicating that extension of the LADN service area is not supported may also be included in the registration request message and then transmitted, or the 1-st identification information may not be transmitted.

In addition, if the UE supports utilization restriction imposed on extension of the LADN service area, then information indicating that utilization restriction imposed on extension of the LADN service area is supported may be configured to be the 1-st identification information, or the 1-st identification information indicating that utilization restriction imposed on extension of the LADN service area is supported may be included in the registration request message and then transmitted. Conversely, if the UE does not support utilization restriction imposed on extension of the LADN service area, then information indicating that utilization restriction imposed on extension of the LADN service area is not supported may be configured to be the 1-st identification information, or the 1-st identification information indicating that utilization restriction imposed on extension of the LADN service area is not supported may be included in the registration request message and then transmitted, or the 1-st identification information may not be transmitted.

Furthermore, the UE may also transmit the 1-st identification information to indicate that the UE supports extension of the LADN service area. In this case, the 1-st identification information may be information indicating that extension of the LADN service area is supported.

Conversely, the UE may also transmit the 1-st identification information to indicate that the UE supports utilization restriction imposed on extension of the LADN service area. In this case, the 1-st identification information may be information indicating that utilization restriction imposed on extension of the LADN service area is supported.

In addition, the UE may also include an SM message (such as the PDU session establishment request message) in the registration request message and then transmit the same, or may transmit the SM message (such as the PDU session establishment request message) together with the registration request message so as to initiate a PDU session establishment procedure in the registration procedure.

If the 5G AN (or gNB) receives the RRC message including the registration request message, then the 5G AN (or gNB) selects an AMF for forwarding the registration request message (S802). In addition, the 5G AN (or gNB) can select an AMF on the basis of the information included in the registration request message and/or the RRC message. The 5G AN (or gNB) acquires the registration request message from the received RRC message, and forwards the registration request message to the selected AMF (S804).

If the AMF receives the registration request message, then the AMF can perform first condition determination. The so-called first condition determination is for determining whether the network (or AMF) accepts the request of the UE. If the first condition determination is true, then the AMF initiates the procedure in (A) in FIG. 6; conversely, if the first condition determination is false, then the AMF initiates the procedure in (B) in FIG. 6.

In addition, the first condition determination may also be performed on the basis of reception of the registration request message and/or each piece of identification information included in the registration request message and/or the subscriber information and/or the network capability information and/or the operator policy and/or the network status and/or the user registration information and/or text stored by the AMF, etc. For example, if the network allows the request of the UE, then the first condition determination is true, and if the network does not allow the request of the UE, then the first condition determination may be false. In addition, if a network of a registration target of the UE and/or devices in the network support a function requested by the UE, then the first condition determination is true, and if the network of the registration target of the UE and/or the devices in the network do not support the function requested by the UE, then the first condition determination may be false. Furthermore, if the identification information received and transmitted is allowed, then the first condition determination is true, and if the identification information received and transmitted is not allowed, then the first condition determination may be false. In addition, conditions for determining whether the first condition determination is true or false may not be limited to the conditions described above.

Firstly, description for a case in which the first condition determination is true is provided. In the procedure in (A) in FIG. 6, the AMF can firstly perform fourth condition determination. The fourth condition determination is for determining whether the AMF receives and transmits the SM message from/to the SMF.

In addition, the fourth condition determination may also be performed on the basis of whether the AMF receives the SM message. In addition, the fourth condition determination may also be performed on the basis of whether the registration request message includes the SM message. For example, if the AMF receives the SM message, and/or if the registration request message includes the SM message, then the fourth condition determination may be true; if the AMF does not receive the SM message, and/or if the registration request message does not include the SM message, then the fourth condition determination may be false. In addition, conditions for determining whether the fourth condition determination is true or false may not be limited to the conditions described above.

If the fourth condition determination is true, then the AMF selects an SMF, and receives and transmits an SM message from/to the selected SMF; conversely, if the fourth condition determination is false, then the AMF does not receive and transmit the SM message (S806). In addition, if the fourth condition determination is true, and if the AMF receives an SM message indicating rejection from the SMF, then the AMF sometimes stops the procedure in (A) in FIG. 6. In this case, the AMF can initiate the procedure in (B) in FIG. 6.

In addition, in S806, during reception and transmission of the SM message from/to the SMF, the AMF can notify the SMF of the identification information included in the registration request message. By receiving and transmitting the SM message from/to the AMF, the SMF can acquire the identification information received from the AMF.

Then, the AMF transmits, by means of the 5G AN (or gNB) and on the basis of reception of the registration request message and/or completion of the reception and transmission of the SM message from/to the SMF, a registration accept message to the UE as a response message to the registration request message (S808). For example, if the fourth condition determination is false, then the AMF may also transmit a registration accept message on the basis of reception of the registration request message from the UE. In addition, if the fourth condition determination is true, then the AMF may also transmit a registration accept message on the basis of completion of the reception and transmission of the SM message from/to the SMF. In addition, the registration accept message is a NAS message received and transmitted on the N1 interface, but is included in the RRC message when reception and transmission of the registration accept message is performed between the UE and the 5G AN (gNB).

The AMF may also include at least one or more pieces of identification information from the 11-th identification information to the 14-th identification information in the registration accept message and then transmit the same. In addition, the AMF may also transmit these pieces of identification information to indicate that the network supports various functions or to indicate that the request of the UE is accepted. Furthermore, if a plurality of pieces of identification information are received and transmitted, then two or more pieces of identification information of these pieces of identification information may also form one or more pieces of identification information. In addition, information indicating that each function is supported and information indicating a request for using each function may be received and transmitted as the same identification information, or may be received and transmitted as different identification information.

If the AMF supports extension of the LADN service area, then information indicating that extension of the LADN service area is supported may be configured to be the 11-th identification information, or the 11-th identification information indicating that extension of the LADN service area is supported may also be included in the registration accept message and then transmitted. Conversely, if the AMF does not support extension of the LADN service area, then information indicating that extension of the LADN service area is not supported may be configured to be the 11-th identification information, or the 11-th identification information indicating that extension of the LADN service area is not supported may also be included in the registration accept message and then transmitted, or the 11-th identification information may not be transmitted.

In addition, if the AMF supports utilization restriction imposed on extension of the LADN service area, then information indicating that utilization restriction imposed on extension of the LADN service area is supported may be configured to be the 11-th identification information, or the 11-th identification information indicating that utilization restriction imposed on extension of the LADN service area is supported may be included in the registration accept message and then transmitted. Conversely, if the AMF does not support utilization restriction imposed on extension of the LADN service area, then information indicating that utilization restriction imposed on extension of the LADN service area is not supported may be configured to be the 11-th identification information, or the 11-th identification information indicating that utilization restriction imposed on extension of the LADN service area is not supported may be included in the registration accept message and then transmitted, or the 11-th identification information may not be transmitted.

Furthermore, the AMF may also transmit the 11-th identification information to indicate that the network supports extension of the LADN service area. Furthermore, the AMF may also transmit the 11-th identification information to indicate that extension of the LADN service area can be used. Furthermore, the AMF may also transmit the 11-th identification information to indicate that the network allows extension of the LADN service area. In this case, the 11-th identification information may be information indicating that extension of the LADN service area is supported.

Conversely, the AMF may also transmit the 11-th identification information indicating that extension of the LADN service area is not supported or not transmit the 11-th identification information to indicate that the network does not support extension of the LADN service area. Furthermore, the AMF may also transmit the 11-th identification information indicating that extension of the LADN service area is not supported or not transmit the 11-th identification information to indicate that extension of the LADN service area cannot be used. Furthermore, the AMF may also transmit the 11-th identification information indicating that extension of the LADN service area is not supported or not transmit the 11-th identification information to indicate that the network does not allow extension of the LADN service area.

Furthermore, the AMF may also transmit the 11-th identification information to indicate that the network supports utilization restriction imposed on extension of the LADN service area. Furthermore, the AMF may also transmit the 11-th identification information to indicate that utilization restriction is imposed on extension of the LADN service area. In this case, the 11-th identification information may be information indicating that utilization restriction imposed on extension of the LADN service area is supported.

Conversely, the AMF may also transmit the 11-th identification information indicating that utilization restriction imposed on extension of the LADN service area is not supported or not transmit the 11-th identification information to indicate that the network does not support utilization restriction imposed on extension of the LADN service area. Furthermore, the AMF may also transmit the 11-th identification information indicating that utilization restriction imposed on extension of the LADN service area is not supported or not transmit the 11-th identification information to indicate that utilization restriction is imposed on extension of the LADN service area.

Here, the AMF may also transmit the 11-th identification information on the basis of the 1-st identification information. Specifically, if the 1-st identification information is the information indicating that extension of the LADN service area is supported, then the AMF may also transmit to the UE the 11-th identification information indicating that the extension of the LADN service area is supported. Conversely, if the 1-st identification information is the information indicating that extension of the LADN service area is not supported, then the AMF may also transmit to the UE the 11-th identification information indicating that extension of the LADN service area is not supported.

Furthermore, if the 1-st identification information is the information indicating that utilization restriction imposed on extension of the LADN service area is supported and therefore the AMF determines to restrict utilization of extension of the LADN service area, then the AMF may configure the information indicating that utilization restriction is imposed on extension of the LADN service area to be the 11-th identification information, or may also transmit to the UE the 11-th identification information indicating that utilization restriction is imposed on extension of the LADN service area. Conversely, if the 1-st identification information is information indicating that extension of the LADN service area is not supported, then the AMF may not transmit the 11-th identification information.

Furthermore, the AMF may also transmit the 12-th identification information to indicate that the network supports the LADN or to indicate that connection to the LADN is allowed. Furthermore, the AMF may also transmit the 12-th identification information to notify the UE of a list of DNNs that can be used in the connection to the LADN and/or an LADN service area that can serve as an area supporting connection to the LADN. Furthermore, the AMF may also transmit the 12-th identification information so as to notify the UE of one or more pieces of S-NSSAI that can be used in the connection to the LADN. In addition, the S-NSSAI that can be used in the connection to the LADN and the DNN and/or the LADN service area that can be used in the connection to the LADN may also be associated with each other.

Here, the AMF may also transmit the 12-th identification information on the basis of the 1-st identification information. Specifically, if the 1-st identification information is information indicating that extension of the LADN service area is supported, then the AMF may configure an extended LADN service area to be the LADN service area, may also configure extended LADN information to be the LADN information, or may also use the configured LADN information as the 12-th identification information and then transmit the same to the UE. Conversely, if the 1-st identification information is information indicating that extension of the LADN service area is not supported, then the AMF may configure an existing LADN service area to be the LADN service area, may also configure existing LADN information to be the LADN information, or may also use the configured LADN information as the 12-th identification information and then transmit the same to the UE.

Conversely, the AMF may not transmit the 12-th identification information to indicate that the network does not support the LADN or to indicate that connection to the LADN is not allowed. Furthermore, the AMF may not transmit the 12-th identification information to indicate that the LADN information stored in the UE is invalid or to indicate to the UE that the LADN information stored in the UE is invalid. Furthermore, the AMF may not transmit the 12-th identification information to indicate that the LADN information stored in the UE needs to be deleted or to indicate to the UE deletion of the LADN information stored in the UE.

Furthermore, the AMF may also transmit void 12-th identification information to indicate that the network does not support the LADN or to indicate that connection to the LADN is not allowed. Furthermore, the AMF may also transmit void 12-th identification information to indicate that the LADN information stored in the UE is invalid or to indicate to the UE that the LADN information stored in the UE is invalid. Furthermore, the AMF may also transmit void 12-th identification information to indicate that the LADN information stored in the UE needs to be deleted or to indicate to the UE deletion of the LADN information stored in the UE.

Here, the AMF may also transmit the 1-st identification information on the basis of the 2-nd identification information. Specifically, if the 2-nd identification information indicates a request for the LADN information, then the AMF may include the 12-th identification information in the registration accept message, or may also transmit the 12-th identification information to the UE. Furthermore, if the 2-nd identification information indicates a request for updating the LADN information, then the AMF may include the 12-th identification information in the registration accept message, or may also transmit the 12-th identification information to the UE. Conversely, if the 2-nd identification information indicates a request for deleting the LADN information, then the AMF may not include the 12-th identification information in the registration accept message, or may also not transmit the 12-th identification information to the UE. Furthermore, if the 2-nd identification information indicates a request for deleting the LADN information, then the AMF may include the void 12-th identification information in the registration accept message, or may also transmit the void 12-th identification information to the UE.

Furthermore, if the LADN information stored in the UE is to be invalidated, then the AMF may not include the 12-th identification information in the registration accept message, or may not transmit the 12-th identification information to the UE. Furthermore, if the LADN information stored in the UE is to be invalidated, then the AMF may include the void 12-th identification information in the registration accept message, or may also transmit the void 12-th identification information to the UE. Furthermore, if the LADN information stored in the UE is to be deleted, then the AMF may not include the 12-th identification information in the registration accept message, or may also not transmit the 12-th identification information to the UE. Furthermore, if the LADN information stored in the UE is to be deleted, then the AMF may include the void 12-th identification information in the registration accept message, or may also transmit the void 12-th identification information to the UE.

Furthermore, during the registration procedure for movement and registration update, if the AMF does not include the 12-th identification information in the registration accept message, then the AMF may identify old LADN information as invalid information, or may also delete the old LADN information. In this case, if a PDU session for LADN has been established, then the AMF may locally release the PDU session for LADN, or may also request the SMF to release the local PDU session for LADN.

More specifically, during the registration procedure for movement and registration update, if the AMF does not include the 12-th identification information in the registration accept message, then the AMF may identify the old LADN information as invalid information, or may also delete the old LADN information. In this case, if one or more PDU sessions for LADN have been established, then the AMF may locally release all of the PDU sessions for LADN, or may also request the SMF to release all of the local PDU sessions for LADN.

Furthermore, during the registration procedure for movement and registration update, if the AMF does not include the 12-th identification information in the registration accept message, then the AMF may identify the old LADN information as invalid information, or may also delete the old LADN information. In this case, if a PDU session for LADN has been established, then the AMF may also request the SMF to release the PDU session for LADN. In this case, the SMF may also initiate a PDU session release flow requested by the network.

More specifically, during the registration procedure for movement and registration update, if the AMF does not include the 12-th identification information in the registration accept message, then the AMF may identify the old LADN information as invalid information, or may also delete the old LADN information. In this case, if one or more PDU sessions for LADN have been established, then the AMF may also request the SMF to release all of the PDU sessions for LADN. In this case, the SMF may also initiate the PDU session release flow requested by the network.

Furthermore, if the LADN information corresponding to the PDU session for LADN is not included in the registration accept message, then the AMF may identify the old LADN information as invalid information, or may also delete the old LADN information. In this case, the AMF may locally release the PDU session for LADN, or may also request the SMF to release the local PDU session for LADN.

Furthermore, if the LADN information corresponding to the PDU session for LADN is not included in the registration accept message, then the AMF may identify the old LADN information as invalid information, or may also delete the old LADN information. In this case, the AMF may also request the SMF to release the PDU session for LADN.

Furthermore, if the LADN information corresponding to the PDU session for LADN is not included in the registration accept message, then the AMF may identify the old LADN information as invalid information, or may also delete the old LADN information. In this case, the AMF may also request the SMF to release the PDU session for LADN. In this case, the SMF may also initiate the PDU session release flow requested by the network.

Furthermore, if the LADN information corresponding to the PDU session for LADN is not included in the registration accept message, then the AMF may identify the old LADN information as invalid information, or may also delete the old LADN information. In this case, the AMF may also request the SMF to release the PDU session for LADN. In this case, the SMF may also initiate the PDU session release flow requested by the network.

Furthermore, the AMF may also transmit the 13-th identification information to indicate the granularity of the LADN service area. More specifically, the AMF may transmit the 13-th identification information together with the 12-th identification information to indicate the granularity of the LADN service area indicated by the LADN service area information included in the LADN information indicated by the 12-th identification information or to indicate an area that can be used as the LADN service area. Specifically, the AMF may transmit the 13-th identification information together with the 12-th identification information to indicate that the LADN service area indicated by the LADN service area information included in the 12-th identification information consists of one or more tracking areas or to indicate that the LADN service area is an area different from the area consisting of one or more tracking areas. Furthermore, the AMF may transmit the 13-th identification information together with the 12-th identification information to indicate that the tracking area ID list is included as the LADN service area information or to indicate that the information requiring assistance from the RAN is included as the LADN service area information or to indicate that the information not requiring any assistance from the RAN is included as the LADN service area information.

Here, the AMF may also determine, on the basis of the 1-st identification information, whether to transmit the 13-th identification information. Specifically, if the 1-st identification information is the information indicating that extension of the LADN service area is supported, then the AMF may also transmit the 13-th identification information to the UE. Conversely, if the 1-st identification information is the information indicating that extension of the LADN service area is not supported, then the AMF may not transmit the 13-th identification information to the UE.

Furthermore, the AMF may also transmit the 14-th identification information to indicate the valid period of the LADN service area. More specifically, the AMF may also transmit the 14-th identification information together with the 12-th identification information to indicate the valid period of the LADN service area indicated by the LADN service area information included in the LADN information indicated by the 12-th identification information.

Here, the AMF may also determine, on the basis of the 1-st identification information, whether to transmit the 14-th identification information. Specifically, if the 1-st identification information is the information indicating that extension of the LADN service area is supported, then the AMF may also transmit the 14-th identification information to the UE. Conversely, if the 1-st identification information is the information indicating that extension of the LADN service area is not supported, then the AMF may not transmit the 14-th identification information to the UE.

Furthermore, the AMF may transmit the 11-th identification information and/or the 13-th identification information and/or the 14-th identification information together with the 12-th identification information to indicate that the extended LADN information and/or the extended LADN service area can be used or to indicate available LADN information and/or available LADN service area information. In this case, the 11-th identification information may be the information indicating that extension of the LADN service area is supported, and the 12-th identification information may be the extended LADN information.

Conversely, the AMF may also transmit the 11-th identification information and/or the 12-th identification information and not transmit the 13-th identification information and/or the 14-th identification information to indicate that the extended LADN information and/or the extended LADN service area cannot be used. In other words, the AMF may also transmit the 11-th identification information and/or the 12-th identification information and not transmit the 13-th identification information and/or the 14-th identification information to indicate that the existing LADN information and/or the existing LADN service area can be used or to indicate available LADN information and/or available LADN service area information. In this case, the 11-th identification information may be the information indicating that extension of the LADN service area is not supported, and the 12-th identification information may be the existing LADN information.

Furthermore, the AMF may also transmit the 12-th identification information and not transmit the 11-th identification information and/or the 13-th identification information and/or the 14-th identification information to indicate that the extended LADN information and/or the extended LADN service area cannot be used. In other words, the AMF may also transmit the 12-th identification information and not transmit the 11-th identification information and/or the 13-th identification information and/or the 14-th identification information to indicate that the existing LADN information and/or the existing LADN service area can be used or to indicate available LADN information and/or available LADN service area information. In this case, the 12-th identification information may be the existing LADN information.

In addition, the AMF may also select and determine, on the basis of the received identification information and/or the subscriber information and/or the network capability information and/or the operator policy and/or the network status and/or the user registration information and/or the text stored by the AMF, etc., which of identification information from the 11-th identification information to the 14-th identification information is included in the registration accept message.

In addition, the AMF may include an SM message (such as a PDU session establishment accept message) in the registration accept message and then transmit the same, or may transmit the SM message (such as the PDU session establishment accept message) together with the registration accept message. The transmission method may also be executed when the registration request message includes an SM message (such as the PDU session establishment request message) and when the fourth condition determination is true. In addition, the transmission method may also be executed when the SM message (such as the PDU session establishment request message) is included together with the registration request message and when the fourth condition determination is true. The AMF may perform such transmission method to indicate that the procedure for SM is accepted in the registration procedure.

In addition, the AMF may also transmit the registration accept message on the basis of the received identification information and/or the subscriber information and/or the network capability information and/or the operator policy and/or the network status and/or the user registration information and/or the text stored by the AMF, etc., to indicate that the request of the UE has been accepted.

Furthermore, the AMF may also include information indicating that part of the requests of the UE are rejected in the registration accept message and then transmit the same or transmit information indicating that part of the requests of the UE are rejected to indicate a reason as to why part of the requests of the UE are rejected. Furthermore, the UE may also receive the information indicating that part of the requests of the UE are rejected to identify a reason as to why part of the requests of the UE are rejected. In addition, the rejection reason may also be information indicating that content in the identification information received by the AMF is not allowed.

The UE receives the registration accept message by means of the 5G AN (gNB) (S808). By receiving the registration accept message, the UE can identify that the UE request in the registration request message is accepted, and can identify content of different pieces of identification information included in the registration accept message.

The UE can then transmit, by means of the 5G AN (gNB), to the AMF a registration complete message used as a response message to the registration accept message (S810). In addition, if SM messages such as the PDU session establishment accept message and the like are received, then the UE may include SM messages such as a PDU session establishment complete message and the like in the registration complete message and then transmit the same, or may also include an SM message to indicate that the procedure for SM has been completed. Here, the registration complete message is a NAS message received and transmitted on the N1 interface, but is included in the RRC message when reception and transmission of the registration complete message is performed between the UE and the 5G AN (gNB).

The AMF receives the registration complete message by means of the 5G AN (gNB) (S810). In addition, each device completes the procedure in (A) in FIG. 6 on the basis of reception and transmission of the registration accept message and/or the registration complete message.

Next, description for a case in which the first condition determination is false is provided. In the procedure in (B) in FIG. 6, the AMF transmits, by means of the 5G AN (gNB), to the UE a registration reject message used as a response message to the registration request message (S812). Here, the registration reject message is a NAS message received and transmitted on the N1 interface, but is included in the RRC message when reception and transmission of the registration reject message is performed between the UE and the 5G AN (gNB).

In addition, the AMF may also transmit the registration reject message to indicate that the UE request in the registration request message is rejected. Furthermore, the AMF may also include information indicating a rejection reason in the registration reject message and then transmit the same, or may also transmit the rejection reason to indicate the rejection reason. Furthermore, the UE may also receive the information indicating the reason as to why the request of the UE is rejected to identify the reason as to why the request of the UE is rejected. In addition, the rejection reason may also be information indicating that content in the identification information received by the AMF is not allowed.

The UE receives the registration reject message by means of the 5G AN (gNB) (S812). By receiving the registration reject message, the UE can identify that the UE request in the registration request message is rejected, and can identify content of different pieces of identification information included in the registration reject message. In addition, after the registration request message is transmitted, even if the registration reject message is not received after a predetermined period, the UE can also identify that the request of the UE is rejected. Each device completes procedure (B) in this procedure on the basis of reception and transmission of the registration reject message.

In addition, the procedure in (B) in FIG. 6 is sometimes initiated when the procedure in (A) in FIG. 6 is stopped. In the procedure in (A) in FIG. 6, if the fourth condition determination is true, then the AMF may also include SM messages indicating rejection such as the PDU session establishment reject message and the like in the registration reject message and then transmit the same, or may also include an SM message indicating rejection to indicate that the procedure for SM is rejected. In this case, the UE may then receive the SM messages indicating rejection such as the PDU session establishment reject message and the like, or may also identify that the procedure for SM is rejected.

Each device completes the registration procedure on the basis of completion of the procedure in (A) or (B) in FIG. 6. In addition, each device may transition, on the basis of completion of the procedure in (A) in FIG. 6, to the state (RM_REGISTERED state) in which the UE has been registered with the network, or may also maintain, on the basis of completion of the procedure in (B) in FIG. 6, the state (RM_DEREGISTERED state) in which the UE has not been registered with the network, or may also transition to the state in which the UE has not been registered with the network. In addition, the transition of each device to each state may be based on completion of the registration procedure, or may be based on establishment of the PDU session.

Furthermore, each device may also process, on the basis of completion of the registration procedure, the information received and transmitted in the registration procedure. For example, if the information indicating that part of the requests of the UE are rejected is received and transmitted, then the reason as to why the request of the UE is rejected can also be identified. Furthermore, each device may execute this procedure again on the basis of the reason as to why the request of the UE is rejected, or may execute a registration procedure for the core network_B or other units.

Furthermore, the UE may also store, on the basis of completion of the registration procedure, the identification information received together with the registration accept message and/or the registration reject message, or may also identify a decision made by the network.

For example, if the 11-th identification information is received, then the UE may also identify that the network supports extension of the LADN service area. Furthermore, if the 11-th identification information is received, then the UE may also identify that using extension of the LADN service area is allowed. In other words, if the 11-th identification information is received, then the UE may identify not only an area consisting of one or more tracking areas but also that an area different from the area consisting of one or more tracking areas can also be configured to be the LADN service area or can serve as the LADN service area. If the 11-th identification information is received, then the UE may also identify that the LADN service area can be modified over time. In these cases, the 11-th identification information may also be the information indicating that extension of the LADN service area is supported. Furthermore, in these cases, the UE may also use the extended LADN information and/or the extended LADN service area to establish a PDU session for LADN, or may also communicate with the LADN.

Conversely, if the 11-th identification information indicating that extension of the LADN service area is not supported is received, or if the 11-th identification information is not received, then the UE may also identify that the network does not support extension of the LADN service area. Furthermore, if the 11-th identification information indicating that extension of the LADN service area is not supported is received, or if the 11-th identification information is not received, then the UE may also identify that using extension of the LADN service area is not allowed. In other words, if the 11-th identification information indicating that extension of the LADN service area is not supported is received, or if the 11-th identification information is not received, then the UE may identify that only the area consisting of one or more tracking areas can be configured to be the LADN service area, or may also identify that only the area consisting of one or more tracking areas can be used as the LADN service area. If the 11-th identification information indicating that extension of the LADN service area is not supported is received, or if the 11-th identification information is not received, then the UE may also identify that the LADN service area cannot be modified over time. In these cases, the UE may use the existing LADN information and/or the existing LADN service area to establish a PDU session for LADN, or may also communicate with the LADN.

Furthermore, if the 11-th identification information is received, then the UE may also identify that the network supports utilization restriction imposed on extension of the LADN service area. Furthermore, if the 11-th identification information is received, then the UE may also identify that utilization restriction is imposed on extension of the LADN service area. In this case, the 11-th identification information may also be the information indicating that utilization restriction imposed on extension of the LADN service area is supported.

Conversely, if the 11-th identification information indicating that utilization restriction imposed on extension of the LADN service area is not supported is received, or if the 11-th identification information is not received, then the UE may also identify that the network does not support utilization restriction imposed on extension of the LADN service area. Furthermore, if the 11-th identification information indicating that utilization restriction imposed on extension of the LADN service area is not supported is received, or if the 11-th identification information is not received, then the UE may also identify that utilization restriction is not imposed on extension of the LADN service area. In addition, if utilization restriction is imposed on extension of the LADN service area, then the UE may also be prohibited from using the extended LADN service area.

Furthermore, if the 12-th identification information is received, then the UE may identify that the network supports the LADN, or may also identify that connection to the LADN is allowed. Furthermore, if the 12-th identification information is received, then the UE may identify a list of DNNs that can be used in the connection to the LADN and/or an LADN service area that can serve as an area supporting connection to the LADN, or may also store the same in text. Furthermore, if the 12-th identification information is received, then the UE may identify one or more pieces of S-NSSAI that can be used in the connection to the LADN, or may also store the same in text. Furthermore, the UE may also identify that the S-NSSAI that can be used in the connection to the LADN and the DNN and/or the LADN service area that can be used in the connection to the LADN are associated with each other, or may also store the S-NSSAI that can be used in the connection to the LADN and the DNN and/or the LADN service area that can be used in the connection to the LADN in text in association with each other.

In other words, if the 12-th identification information is received, then the UE may identify that a PDU session for LADN corresponding to the received LADN DNN can be established, or may also identify that a PDU session for LADN corresponding to the received LADN S-NSSAI can be established. Furthermore, if the 12-th identification information is received, then the UE may also identify that a PDU session for LADN corresponding to a combination of the received LADN DNN and the received LADN S-NSSAI can be established.

Furthermore, in other words, if the 12-th identification information is received, then the UE may identify that the LADN service area is an area in which a PDU session for LADN corresponding to the LADN DNN can be established, or may also identify that the LADN service area is an area in which a PDU session for LADN corresponding to the LADN S-NSSAI can be established. Furthermore, if the 12-th identification information is received, then the UE may also identify that the received LADN service area is an area in which a PDU session for LADN corresponding to a combination of the LADN DNN and the LADN S-NSSAI can be established.

Conversely, if the 12-th identification information is not received, then the UE may identify that the network does not support the LADN, or may also identify that the connection to the LADN is not allowed. Furthermore, if the 12-th identification information is not received, then the UE may identify that the LADN information stored in the UE is invalid, or may also invalidate the LADN information stored in the UE. Furthermore, if the 12-th identification information is not received, then the UE may identify that the LADN information stored in the UE needs to be deleted or that the LADN information stored in the UE may be deleted.

Furthermore, if void 12-th identification information is received, then the UE may identify that the network does not support the LADN, or may also identify that the connection to the LADN is not allowed. Furthermore, if the void 12-th identification information is received, then the UE may identify that the LADN information stored in the UE is invalid, or may also invalidate the LADN information stored in the UE. Furthermore, if the void 12-th identification information is not received, then the UE may identify that the LADN information stored in the UE needs to be deleted or that the LADN information stored in the UE may be deleted.

In these cases, when the UE holds a PDU session for LADN, the UE may also locally release the PDU session for LADN. More specifically, in these cases, when the UE holds one or more PDU sessions for LADN, the UE may also locally release all of the PDU sessions for LADN. Furthermore, in these cases, when the UE holds a PDU session for LADN, the PDU session for LADN may also be released. More specifically, in these cases, when the UE holds one or more PDU sessions for LADN, all of the PDU sessions for LADN may also be released.

Furthermore, in these cases, when the UE holds a PDU session for LADN, the UE may also release the PDU session for LADN by means of a PDU session release procedure requested by the network. Furthermore, in these cases, when the UE holds a PDU session for LADN, the UE may also release the PDU session for LADN by means of a PDU session release procedure requested by the UE. Furthermore, in these cases, when the UE holds a PDU session for LADN, the UE may also initiate the PDU session release procedure requested by the UE in order to release the PDU session for LADN.

Furthermore, in these cases, if the UE holds a PDU session corresponding to the old LADN information, then the UE may also locally release the PDU session. Furthermore, in these cases, when the UE holds one or more PDU sessions corresponding to the old LADN information, the UE may also locally release all of the PDU sessions corresponding to the old LADN information.

Furthermore, during the registration procedure for movement and registration update, if the AMF does not include the 12-th identification information in the registration accept message, then the UE may also delete the old LADN information. In this case, if the UE holds a PDU session for LADN, then the UE may also locally release the PDU session for LADN.

More specifically, during the registration procedure for movement and registration update, if the AMF does not include the 12-th identification information in the registration accept message, then the UE may also delete the old LADN information. In this case, if the UE holds one or more PDU sessions for LADN, then the UE may also locally release all of the PDU sessions for LADN.

Furthermore, during the registration procedure for movement and registration update, if the AMF does not include the 12-th identification information in the registration accept message, then the UE may also delete the old LADN information. In this case, if the UE holds a PDU session for LADN, then the PDU session for LADN may also be released.

More specifically, during the registration procedure for movement and registration update, if the AMF does not include the 12-th identification information in the registration accept message, then the UE may also delete the old LADN information. In this case, if the UE holds one or more PDU sessions for LADN, then all of the PDU sessions for LADN may also be released.

Furthermore, during the registration procedure for movement and registration update, if the AMF does not include the 12-th identification information in the registration accept message, then the UE may also delete the old LADN information. In this case, if the UE holds a PDU session for LADN, then the UE may also release the PDU session for LADN by means of a PDU session release procedure requested by the network.

Furthermore, during the registration procedure for movement and registration update, if the AMF does not include the 12-th identification information in the registration accept message, then the UE may also delete the old LADN information. In this case, if the UE holds a PDU session for LADN, then the UE may also release the PDU session for LADN by means of a PDU session release procedure requested by the UE.

Furthermore, during the registration procedure for movement and registration update, if the AMF does not include the 12-th identification information in the registration accept message, then the UE may also delete the old LADN information. In this case, if the UE holds a PDU session for LADN, then the UE may also initiate the PDU session release procedure requested by the UE in order to release the PDU session for LADN.

Furthermore, during the registration procedure for movement and registration update, if the AMF does not include the 12-th identification information in the registration accept message, then the UE may also delete the old LADN information. In this case, if the UE holds a PDU session corresponding to the old LADN information, then the UE may also locally release the PDU session.

Furthermore, during the registration procedure for movement and registration update, if the AMF does not include the 12-th identification information in the registration accept message, then the UE may also delete the old LADN information. In this case, if the UE holds one or more PDU sessions corresponding to the old LADN information, then the UE may also locally release all of the PDU sessions corresponding to the old LADN information.

Furthermore, if the old LADN information is deleted, then the UE may also identify that the UE is located outside the LADN service area. Furthermore, even if the UE is located outside the LADN service area, the UE may also maintain the PDU session for LADN. Specifically, even if the UE is located outside the LADN service area, the UE may also maintain the PDU session for LADN until a PDU session release command message is received. In addition, the PDU session release command message may be a message received and transmitted in the PDU session release procedure requested by the network, or may be a message received and transmitted in the PDU session release procedure requested by the UE.

Here, the described released PDU session for LADN may also be the PDU session corresponding to the old LADN information. In other words, the released PDU session for LADN may also be the PDU session corresponding to the deleted LADN information.

Furthermore, the PDU session release procedure requested by the network may also be a procedure initiated by transmitting a PDU session release command message to the UE by means of the SMF. In the PDU session release procedure requested by the network, the UE may also release the PDU session on the basis of reception of the PDU session release command message from the SMF and/or completion of the PDU session release procedure requested by the network.

Furthermore, the PDU session release procedure requested by the UE may also be a procedure initiated by transmitting a PDU session release request message to the SMF by means of the UE. In the PDU session release procedure requested by the UE, the UE may receive the PDU session release command message from the SMF and use the same as a response message to the PDU session release request message, or may also release the PDU session on the basis of reception of the PDU session release command message from the SMF and/or completion of the PDU session release procedure requested by the UE.

In addition, so-called each device holding a PDU session may also refer to that each device has established a PDU session. Specifically, so-called the UE holding a PDU session may also refer to that the UE has established a PDU session. Furthermore, so-called the AMF holding a PDU session may also refer to that the AMF has established a PDU session. Furthermore, so-called the SMF holding a PDU session may also refer to that the SMF has established a PDU session.

Furthermore, if the 13-th identification information is received, then the UE may also identify the granularity of the LADN service area. More specifically, if the 13-th identification information is received together with the 12-th identification information, then the UE may identify the granularity of the LADN service area indicated by the LADN service area information included in the 12-th identification information, or may also store the same and the LADN service area information in text in association with each other. Specifically, if the 13-th identification information is received together with the 12-th identification information, then on the basis of the granularity of the LADN service area, the UE may identify that the LADN service area indicated by the LADN service area information is an area consisting of one or more tracking areas, or may also identify that the LADN service area is an area different from the area consisting of one or more tracking areas. Furthermore, if the 13-th identification information is received together with the 12-th identification information, then the UE may identify that the tracking area ID list is included as the LADN service area information, may also identify that the information requiring assistance from the RAN is included as the LADN service area information, and may also identify that the information not requiring any assistance from the RAN is included as the LADN service area information.

Conversely, if the 13-th identification information is not received, then the UE may also use a default granularity as the granularity of the LADN service area. Furthermore, if the 13-th identification information is received but the 13-th identification information is invalid information, and/or if the UE does not support extension of the LADN service area, then the UE may skip the received 13-th identification information, or may also use the default granularity as the granularity of the LADN service area. Here, the default granularity may be a granularity configured in advance for the UE, or may also be a granularity indicated by information previously received from the network. Furthermore, if the default granularity is used, then the LADN service area may also be an area consisting of one or more tracking areas, and the LADN service area information may also be a tracking area ID list.

In addition, if the 12-th identification information includes a plurality of pieces of information indicating LADN, then the UE may also store the granularity of the LADN service area and each piece of information indicating LADN in text in association with each other. Furthermore, if the 12-th identification information includes a plurality of pieces of LADN service area information, then the UE may also store the granularity of the LADN service area and each piece of LADN service area information in text in association with each other.

Furthermore, if the 14-th identification information is received, then the UE may also identify the valid period of the LADN service area. More specifically, if the 14-th identification information is received together with the 12-th identification information, then the UE may also identify the valid period of the LADN service area indicated by the LADN service area information included in the 12-th identification information, or may also store the same and the LADN service area information in text in association with each other.

Conversely, if the 14-th identification information is not received, then a default period may also be used as the valid period of the LADN service area. Furthermore, if the 14-th identification information is received but the 14-th identification information is invalid information, and/or if the UE does not support extension of the LADN service area, then the UE may skip the received 14-th identification information, or may also use the default period as the valid period of the LADN service area. Here, the default period may be a period configured in advance for the UE, or may also be a period indicated by information previously received from the network. Furthermore, the default period may also be a period ending at a time point when the LADN information is updated.

In addition, if the 12-th identification information includes a plurality of pieces of information indicating LADN, then the UE may also store the valid period of the LADN service area and each piece of information indicating LADN in text in association with each other. Furthermore, if the 12-th identification information includes a plurality of pieces of LADN service area information, then the UE may also store the valid period of the LADN service area and each piece of LADN service area information in text in association with each other.

Furthermore, if the 11-th identification information and/or the 13-th identification information and/or the 14-th identification information are received together with the 12-th identification information, then the UE may identify that the extended LADN information and/or the extended LADN service area can be used, or may also store the available LADN information and/or the available LADN service area information in text. Furthermore, in this case, the UE may identify that the received LADN information is extended LADN information, or may also use the received LADN information as extended LADN information and store the same in text. Furthermore, in this case, the UE may identify that the LADN service area indicated by the received LADN service area information is an extended LADN service area, or may also use the received LADN service area information as the LADN service area information indicating the extended LADN service area and store the same in text. In this case, the 11-th identification information may be the information indicating that extension of the LADN service area is supported, and the 12-th identification information may be the extended LADN information.

Conversely, if the 11-th identification information and/or the 12-th identification information is received and the 13-th identification information and/or the 14-th identification information is not received, and/or if the 12-th identification information is received and the 11-th identification information and/or the 13-th identification information and/or the 14-th identification information is not received, then the UE may also identify that the extended LADN information and/or the extended LADN service area cannot be used. In this case, the UE may identify that the existing LADN information and/or the existing LADN service area can be used, or may also store the available LADN information and/or the available LADN service area information in text. Furthermore, in this case, the UE may identify that the received LADN information is existing LADN information, or may also use the received LADN information as the existing LADN information and store the same in text. Furthermore, in this case, the UE may identify that the LADN service area indicated by the received LADN service area information is an existing LADN service area, or may also use the received LADN service area information as the LADN service area information indicating the existing LADN service area and store the same in text. In this case, the 11-th identification information may be the information indicating that extension of the LADN service area is not supported, and the 12-th identification information may be the existing LADN information.

Furthermore, if the 12-th identification information is received in a state in which the UE does not support extension of the LADN service area, then the UE may also identify that the extended LADN information and/or the extended LADN service area cannot be used. In this case, the UE may identify that the existing LADN information and/or the existing LADN service area can be used, or may also store the available LADN information and/or the available LADN service area information in text. Furthermore, in this case, the UE may identify that the received LADN information is existing LADN information, or may also use the received LADN information as the existing LADN information and store the same in text. Furthermore, in this case, the UE may identify that the LADN service area indicated by the received LADN service area information is an existing LADN service area, or may also use the received LADN service area information as the LADN service area information indicating the existing LADN service area and store the same in text. In this case, the 12-th identification information may be the existing LADN information.

Furthermore, if at least the 12-th identification information is received and is located in the LADN service area indicated by the received information, then the UE may identify that the PDU session for LADN can be established, or may also initiate the PDU session establishment procedure for establishing the PDU session for LADN. In other words, if at least the 12-th identification information is received and is located outside the LADN service area indicated by the received information, then the UE may identify that the PDU session for LADN cannot be established, or may also prohibit the PDU session establishment procedure for establishing the PDU session for LADN.

Furthermore, the UE may also initiate, on the basis of update of the LADN information and/or determination on whether the UE is located in the LADN service area, the PDU session establishment procedure for establishing the PDU session for LADN. Specifically, the UE may also initiate, on the basis of determination that the UE is located in the LADN service area, the PDU session establishment procedure for establishing the PDU session for LADN. Conversely, each device may release the PDU session for LADN on the basis of determination that the UE is located outside the LADN service area, or may also release a user plane resource associated with the PDU session for LADN.

Here, determination on whether the UE is located in the LADN service area may be implemented on the basis of the extended LADN service area, or may also be implemented on the basis of the existing LADN service area. In other words, if each device stores the extended LADN service area, each device may also determine, then on the basis of the extended LADN service area, whether the UE is in the LADN service area. Conversely, if each device stores the existing LADN service area, each device may also determine, then on the basis of the existing LADN service area, whether the UE is in the LADN service area.

Furthermore, if the stored LADN service area is the tracking area ID list, then determination on whether the UE is located in the LADN service area may also be performed on the basis of comparison between the LADN service area information stored in the UE and a tracking area ID acquired from the RAN. Specifically, if the tracking area ID acquired from the RAN is included in the LADN service area information stored in the UE, then the UE may also identify that the UE is located in the LADN service area and store the same. Conversely, if the tracking area ID acquired from the RAN is not included in the LADN service area information stored in the UE, then the UE may also identify that the UE is located outside the LADN service area and store the same.

Furthermore, if the stored LADN service area is the information requiring assistance from the RAN, then determination on whether the UE is located in the LADN service area may also be performed on the basis of comparison between the LADN service area information stored in the UE and information acquired from the RAN. Specifically, if the information acquired from the RAN is included in the LADN service area information stored in the UE, then the UE may also identify that the UE is located in the LADN service area and store the same. Conversely, if the information acquired from the RAN is not included in the LADN service area information stored in the UE, then the UE may also identify that the UE is located outside the LADN service area and store the same.

Furthermore, if the stored LADN service area is the information not requiring any assistance from the RAN, then determination on whether the UE is located in the LADN service area may also be performed on the basis of comparison between the LADN service area information stored in the UE and information acquired from devices other than the RAN. Specifically, if the information acquired from devices other than the RAN is included in the LADN service area information stored in the UE, then the UE may also identify that the UE is located in the LADN service area and store the same. Conversely, if the information acquired from devices other than the RAN is not included in the LADN service area information stored in the UE, then the UE may also identify that the UE is located outside the LADN service area and store the same.

In addition, determination on whether the UE is located in the LADN service area may also be performed on the basis of reception and transmission of control messages transmitted from the network to the UE. Specifically, the UE may also identify, on the basis of reception of control messages from the network, that the UE is located in the LADN service area and store the same. Conversely, the UE may also identify, on the basis of reception of control messages from the network, that the UE is located outside the LADN service area and store the same. Here, the control message transmitted from the network to the UE may be, for example, a control message for Location Services (LCS). In addition, determination on whether the UE is located in the LADN service area may not be limited thereto.

Furthermore, during the valid period of the LADN service area, the UE may identify that the PDU session for LADN can be established, or may also initiate the PDU session establishment procedure for establishing the PDU session for LADN. In other words, outside the valid period of the LADN service area, the UE may identify that the PDU session for LADN cannot be established, or may also prohibit the PDU session establishment procedure for establishing the PDU session for LADN.

Furthermore, the UE may also initiate, on the basis of update of the LADN information and/or determination on whether the LADN service area is valid, the PDU session establishment procedure for establishing the PDU session for LADN. Specifically, the UE may also initiate, on the basis that the LADN service area is valid, the PDU session establishment procedure for establishing the PDU session for LADN. Conversely, each device may release, on the basis that the LADN service area is invalid, the PDU session for LADN established in association with the invalid LADN service area, or may also release the user plane resource associated with the PDU session for LADN.

Here, determination on the validity of the LADN service area may be performed on the basis of the information indicating the valid period of the LADN service area. Specifically, the UE may also compare the valid period of the LADN service area with a current time point, and if the current time point is within the valid period of the LADN service area, then it is determined that the LADN service area is valid. Conversely, the UE may also compare the valid period of the LADN service area with the current time point, and if the current time point is outside the valid period of the LADN service area, then it is determined that the LADN service area is invalid. Furthermore, the UE may also validate the associated LADN service area on the basis of starting of the valid period of the LADN service area indicated by the received information. Conversely, the UE may also invalidate the associated LADN service area on the basis of ending of the valid period of the LADN service area indicated by the received information.

In addition, determination on the validity of the LADN service area may also be performed on the basis of reception of the control message from the network. Specifically, if the control message is received from the network, then the UE may determine that the LADN service area is valid. Furthermore, if the control message cannot be received from the network, then the UE may determine that the LADN service area is not valid. Conversely, if the control message is received from the network, then the UE may also determine that the LADN service area is not valid. Furthermore, if the control message cannot be received from the network, then the UE may also determine that the LADN service area is valid. Furthermore, the UE may validate the LADN service area on the basis of reception of the control message from the network. Conversely, the UE may also invalidate the LADN service area on the basis of reception of the control message from the network. In addition, determination on the validity of the LADN service area may not be limited thereto.

3.2.2 PDU Session Establishment Procedure

Next, brief description for the PDU session establishment procedure for establishing a PDU session is provided with reference to FIG. 7. The PDU session establishment procedure is a procedure in the 5GS. Hereinafter, so-called this procedure refers to the PDU session establishment procedure. The PDU session establishment procedure is a procedure for each device to establish a PDU session. In addition, each device may initiate the PDU session establishment procedure at any timing in the registered state that the device entered after completion of the registration procedure. In addition, each device may also execute the PDU session establishment procedure in the registration procedure. In addition, each device may also establish a PDU session on the basis of completion of the PDU session establishment procedure. In addition, the PDU session establishment procedure may be a procedure initiated by the UE, or may also be a procedure initiated by the UE request. Each device can establish a plurality of PDU sessions by executing the PDU session establishment procedure a plurality of times.

Here, if the PDU session establishment procedure is a PDU session establishment procedure for establishing the PDU session for LADN, then each device may also establish the PDU session for LADN on the basis of completion of the PDU session establishment procedure. In other words, if the PDU session establishment procedure is a PDU session establishment procedure using the LADN DNN, then each device may also establish the PDU session for LADN on the basis of completion of the PDU session establishment procedure.

Furthermore, if the UE is located in the area supporting connection to the LADN and/or located in the LADN service area, then the UE may also initiate the PDU session establishment procedure in order to establish the PDU session for LADN. Conversely, if the UE is located outside the LADN service area, then the UE may also be prohibited from executing the PDU session establishment procedure for establishing the PDU session for LADN.

In other words, if the UE is located in the area supporting connection to the LADN and/or if the UE is located in the LADN service area, then each device may also initiate the PDU session establishment procedure in order to establish the PDU session for LADN. Conversely, if the UE is located outside the LADN service area, then the network device may also reject a request for the PDU session establishment procedure for establishing the PDU session for LADN.

Firstly, the UE transmits, by means of the 5G AN (gNB) and the AMF, to the SMF a NAS message including a PDU session establishment request message (S900) (S902) (S904) so as to initiate the PDU session establishment procedure.

Specifically, the UE transmits, by means of the 5G AN (gNB) and the N1 interface, to the AMF a NAS message including a PDU session establishment request message (S900). In addition, the NAS message including the PDU session establishment request message may also be an MM message. Furthermore, the MM message may also be an uplink NAS transport (UL NAS TRANSPORT) message. Here, a case in which the PDU session establishment request message includes identification information and/or a value may refer to that the identification information and/or the value is included in the MM message including the PDU session establishment request message.

Here, the UE can include at least the 26-st identification information in the PDU session establishment request message and/or NAS message, and then transmit the same; however, the UE can also include at least the 26-th identification information in a control message different from the above messages such as in a control message of a layer (such as the MAC layer, the RLC layer, and the PDCP layer) lower than the RRC layer, and then transmit the same. These pieces of identification information may also be included in these messages to indicate the request of the UE. In addition, two or more pieces of identification information of these pieces of identification information may also form one or more pieces of identification information.

Furthermore, the UE may also transmit the 26-th identification information to indicate a request for establishing a PDU session corresponding to a DNN indicated by the 26-th identification information or to indicate a DNN requested by the UE. In addition, the 26-th identification information may be a DNN for identifying a DN indicated by identification information received and transmitted together with the 26-th identification information and supporting one or more functions. Furthermore, the 26-th identification information may be the DNN received in the registration procedure, or may also be the LADN.

Here, if the PDU session establishment procedure is the PDU session establishment procedure for establishing the PDU session for LADN, then the UE may also include an LADN DNN of the DNN that can be used in the connection to the LADN in the PDU session establishment request message, and then transmit the same. Furthermore, if the PDU session establishment procedure is the PDU session establishment procedure for establishing the PDU session for LADN, then the UE may include LADN S-NSSAI of the S-NSSAI that can be used in the connection to the LADN in the PDU session establishment request message and then transmit the same, or may also include S-NSSAI associated with the LADN DNN and then transmit the same.

In these cases, the UE may select the LADN DNN included in the PDU session establishment request message from LADN DNNs included in the LADN information received before execution of the PDU session establishment procedure, or may also select the LADN DNN included in the PDU session establishment request message from LADN DNNs stored in the UE. Furthermore, the UE may also select the LADN S-NSSAI included in the PDU session establishment request message from LADN S-NSSAI included in the LADN information received before execution of the PDU session establishment procedure, or may also select the LADN S-NSSAI included in the PDU session establishment request message from LADN S-NSSAI stored in the UE. Furthermore, the UE may also select the S-NSSAI associated with the LADN DNN included in the PDU session establishment request message, and include the selected S-NSSAI in the PDU session establishment request message.

Furthermore, if the LADN information received before execution of the PDU session establishment procedure includes a plurality of LADN DNNs and/or if a plurality of LADN DNNs are stored, then the UE may also select the LADN DNN on the basis of the LADN service area information, include the selected LADN DNN in the PDU session establishment request message, and then transmit the same. Furthermore, if the LADN information received before execution of the PDU session establishment procedure includes a plurality pieces of LADN S-NSSAI and/or if a plurality pieces of LADN S-NSSAI are stored, then the UE may also select the LADN S-NSSAI on the basis of the LADN service area information, include the selected LADN S-NSSAI in the PDU session establishment request message, and then transmit the same. More specifically, if the LADN information received before execution of the PDU session establishment procedure includes a plurality pieces of information indicating LADN and/or if a plurality pieces of information indicating LADN are stored, then the UE may also select the information indicating LADN on the basis of the LADN service area information, include the LADN DNN and/or the LADN S-NSSAI included in the selected information indicating LADN in the PDU session establishment request message, and then transmit the same.

If the AMF receives the NAS message including the PDU session establishment request message (S900), then the PDU session establishment request message is acquired from the NAS message, and SM is selected as a forwarding target of the PDU session establishment request message (S902). In addition, the AMF may also select an SMF of the forwarding target on the basis of the identification information included in the PDU session establishment request message and/or in the NAS message and/or the subscriber information and/or the network capability information and/or the operator policy and/or the network status and/or the user registration information and/or the text stored by the AMF, etc.

The AMF forwards the PDU session establishment request message to the selected SMF by means of the N11 interface (S904).

If the SMF receives the PDU session establishment request message (S904), then the SMF identifies various identification information included in the PDU session establishment request message. In addition, the SMF performs third condition determination. The third condition determination is for determining whether the SMF accepts the request of the UE. In the third condition determination, the SMF determines whether the third condition determination is true or false. If the third condition determination is true, then the SMF initiates the procedure in (A) in FIG. 7, and if the third condition determination is false, then the SMF initiates the procedure in (B) in FIG. 7.

In addition, the third condition determination may also be performed on the basis of the PDU session establishment request message and/or the identification information included in the PDU session establishment request message and/or the subscriber information and/or the network capability information and/or the operator policy and/or the network status and/or the user registration information and/or text stored by the SMF, etc. For example, if the network allows the request of the UE, then the third condition determination may be true. In addition, if the network does not allow the request of the UE, then the third condition determination may be false. Furthermore, if a network of a connection target of the UE and/or devices in the network support a function requested by the UE, then the third condition determination may be true, and if the network of the connection target of the UE and/or the devices in the network do not support the function requested by the UE, then the third condition determination may be false. Furthermore, if the identification information received and transmitted is allowed, then the third condition determination is true, and if the identification information received and transmitted is not allowed, then the third condition determination may be false. In addition, conditions for determining whether the third condition determination is true or false may not be limited to the conditions described above.

Next, description for steps of a case in which the third condition determination is true, namely steps of the procedure in (A) in FIG. 7, is provided. The SMF selects a UPF of an establishment target of the PDU session, and transmits a session establishment request message to the selected UPF by means of the N4 interface (S906) so as to initiate the procedure in (A) in FIG. 7.

Here, the SMF may also select one or more UPFs according to identification information acquired on the basis of reception of the PDU session establishment request message and/or the subscriber information and/or the network capability information and/or the operator policy and/or the network status and/or the user registration information and/or the text stored by the SMF, etc. In addition, if a plurality of UPFs are selected, then the SMF may also transmit the session establishment request message to each UPF.

The UPF receives the session establishment request message from the SMF by means of the N4 interface (S906), and prepares text for the PDU session. Furthermore, the UPF transmits a session establishment response message to the SMF by means of the N4 interface on the basis of reception of the session establishment request message and/or preparation of the text for the PDU session (S908).

The SMF receives the session establishment response message from the UPF by means of the N4 interface, and uses the same as a response message to the session establishment request message (S908). The SMF may also perform, on the basis of reception of the PDU session establishment request message and/or selection of the UPF and/or reception of the session establishment response message, allocation of addresses allocated to the UE.

The SMF transmits a PDU session establishment accept message to the UE by means of the AMF on the basis of reception of the PDU session establishment request message and/or selection of the UPF and/or reception of the session establishment response message and/or completion of the allocation of addresses allocated to the UE (S910) (S912).

Specifically, if the SMF transmits the PDU session establishment accept message to the AMF by means of the N11 interface (S910), then the AMF having received the PDU session establishment request message transmits, by means of the N1 interface, to the UE a NAS message including the PDU session establishment accept message (S912). In addition, the PDU session establishment accept message is a NAS message, and may be a response message to the PDU session establishment request. Furthermore, the PDU session establishment accept message may also be included in the MM message and received and transmitted on the N1 interface. Furthermore, the MM message may be a NAS message, or may also be a downlink NAS transport (DL NAS TRANSPORT) message. Here, a case in which the PDU session establishment accept message includes identification information and/or a value may refer to that the identification information and/or the value is included in the MM message including the PDU session establishment accept message. In addition, the PDU session establishment accept message can indicate that establishment of the PDU session is accepted.

Here, the SMF and the AMF may also transmit the PDU session establishment accept message to indicate that the UE request concerning the PDU session establishment request is accepted.

The SMF and the AMF may also include at least the 36-th identification information in the PDU session establishment accept message and then transmit the same. In addition, the SMF and the AMF may transmit these pieces of identification information to indicate that the network supports various functions or to indicate that the request of the UE is accepted. Furthermore, two or more pieces of identification information of these pieces of identification information may also form one or more pieces of identification information. In addition, information indicating that each function is supported and information indicating a request for using each function may be received and transmitted as the same identification information, or may be received and transmitted as different identification information.

Furthermore, the SMF and the AMF may also transmit the 36-th identification information to indicate that a request for establishing a PDU session corresponding to a DNN indicated by the 36-th identification information is accepted or to indicate that the PDU session is to be established. Furthermore, the SMF and the AMF may also transmit the 36-th identification information to indicate a DNN selected and determined by the network. In addition, the 36-th identification information may also be a DNN for identifying a DN indicated by identification information received and transmitted together with the 36-th identification information and supporting one or more functions. Furthermore, the 36-th identification information may be the DNN transmitted in the registration procedure, or may also be the LADN.

In addition, the SMF and the AMF may also select and determine, on the basis of the received identification information and/or the subscriber information and/or the network capability information and/or the operator policy and/or the network status and/or the user registration information and/or the text stored by the AMF, etc., whether to include at least the 36-th identification information in the PDU session establishment accept message.

In addition, the SMF and the AMF can include a selected and/or allowed PDU session ID in the PDU session establishment accept message. In addition, the SMF and the AMF can specify a PDU session type indicating a type of the selected and/or allowed PDU session. The PDU session type may be, as described above, any one of IPv4, IPv6, IP, Ethernets, and Unstructured. In addition, the SMF and the AMF can include an SSC mode of the selected and/or allowed PDU session in the PDU session establishment accept message.

Furthermore, the SMF and the AMF can include an approved QoS rule group in the PDU session establishment accept message. In addition, one or more QoS rules may also be included in the approved QoS rule group. Furthermore, in this procedure, if a plurality of QoS flows and/or user plane radio bearers are established, then a plurality of QoS rules may also be included in the approved QoS rule group. Conversely, in this procedure, if only one QoS flow and/or user plane radio bearer is established, then one QoS rule may also be included in the approved QoS rule group.

Furthermore, the SMF may also include information indicating that part of the requests of the UE are rejected in the PDU session establishment accept message and then transmit the same, or may also transmit information indicating that part of the requests of the UE are rejected to indicate a reason as to why part of the requests of the UE are rejected. Furthermore, the UE may also receive the information indicating that part of the requests of the UE are rejected to identify a reason as to why part of the requests of the UE are rejected. In addition, the rejection reason may also be information indicating that content in the identification information received by the SMF is not allowed.

The UE receives the NAS message including the PDU session establishment accept message from the AMF by means of the N1 interface (S912). The UE may also transmit a PDU session establishment complete message to the SMF by means of the AMF and on the basis of reception of the PDU session establishment accept message and/or the NAS message including the PDU session establishment accept message (S914) (S916). By receiving the PDU session establishment accept message, the UE can identify that the UE request concerning the PDU session establishment request is accepted.

Specifically, the UE transmits the PDU session establishment complete message to the AMF by means of the N1 interface (S914). If the AMF receives the PDU session establishment complete message from the UE, then the AMF transmits the PDU session establishment complete message to the SMF by means of the N11 interface (S916).

In addition, the PDU session establishment complete message transmitted by the AMF to the SMF may be a response message to the PDU session establishment accept message transmitted from the SMF to the AMF in S910. In addition, the PDU session establishment complete message may be a NAS message. In addition, the PDU session establishment complete message only needs to be a message indicating completion of the PDU session establishment procedure.

If the SMF receives the PDU session establishment complete message from the AMF by means of the N11 interface (S916), then second condition determination can be performed. The second condition determination is for determining a type of the message on the N4 interface performing reception and transmission. If the second condition determination is true, and if the SMF transmits a session modification request message to the UPF by means of the N4 interface (S918), then a session modification accept message transmitted from the UPF is received and is used as a response message to the session modification request message (S920). If the second condition determination is false, and if the SMF transmits a session establishment request message to the UPF by means of the N4 interface (S918), then a session modification accept message transmitted from the UPF is received and is used as a response message to the session establishment request message (S920).

In addition, the second condition determination may also be performed on the basis of whether a session on the N4 interface for the PDU session is established. For example, if a session on the N4 interface for the PDU session is established, then the second condition determination may be true, and if a session on the N4 interface for the PDU session is not established, then the second condition determination may be false. In addition, conditions for determining whether the second condition determination is true or false may not be limited to the conditions described above.

Each device completes the procedure in (A) in the PDU session establishment procedure on the basis of reception and transmission of the PDU session establishment complete message and/or reception and transmission of the session modification response message and/or reception and transmission of the session establishment response message. When the procedure in (A) in this procedure is completed, the UE is in a state in which a PDU session for the DN has been established. Here, if the PDU session establishment procedure is a PDU session establishment procedure for establishing the PDU session for LADN, then each device may also establish the PDU session for LADN on the basis of completion of the procedure in (A) in this procedure.

Next, description for steps of the procedure in (B) in the PDU session establishment procedure is provided. The SMF transmits a PDU session establishment reject message to the UE by means of the AMF (S922) (S924). Specifically, the SMF transmits a PDU session establishment reject message to the AMF by means of the N11 interface (S922). If the AMF receives the PDU session establishment request message from the SMF by means of the N11 interface (S922), then the N1 interface is used to transmit the PDU session establishment reject message to the UE (S924).

In addition, the PDU session establishment reject message may be a NAS message, or may also be an SM message transmitted from the SMF to the UE. In addition, the PDU session establishment reject message only needs to be a message indicating that establishment of the PDU session is rejected. Furthermore, the PDU session establishment reject message may also be included in the MM message and received and transmitted on the N1 interface. Furthermore, the MM message may be a NAS message, or may also be a downlink NAS transport (DL NAS TRANSPORT) message. Here, a case in which the PDU session establishment reject message includes identification information and/or a value may refer to that the identification information and/or the value is included in the MM message including the PDU session establishment reject message.

Here, the SMF may also transmit the PDU session establishment reject message to indicate that the UE request concerning the PDU session establishment request is rejected. Furthermore, the SMF may also include information indicating a rejection reason in the PDU session establishment reject message and then transmit the same, or may also transmit the rejection reason to indicate the rejection reason. Furthermore, the UE may also receive the information indicating the reason as to why the request of the UE is rejected to identify the reason as to why the request of the UE is rejected. In addition, the rejection reason may also be information indicating that content in the identification information received by the SMF is not allowed.

The SMF and/or the AMF may also include at least the 41-st identification information and/or a back-off timer value in the PDU session establishment reject message and then transmit the same or may also transmit the 41-st identification information and/or the back-off timer value to indicate that the request of the UE is rejected or to indicate a reason as to why the request of the UE is rejected.

Furthermore, the SMF and/or the AMF may also transmit the 41-st identification information to indicate that the request for establishing a PDU session for LADN is rejected or to indicate that the PDU session for LADN has not been established. Furthermore, the SMF and/or the AMF may also indicate that the UE is out of the LADN service, or may also indicate that the PDU session for LADN cannot be established in the current area. Furthermore, the SMF and/or the AMF may also transmit the 41-st identification information to indicate that the LADN information stored by the UE is not valid or to indicate that the LADN information stored by the UE needs to be updated. Here, the LADN service area may also be an LADN service area corresponding to the LADN DNN requested by the UE.

Furthermore, the SMF and/or the AMF may also transmit the back-off timer value to instruct the UE to configure the back-off timer value to be the transmitted value or to instruct the back-off timer configured with the transmitted value to start.

Furthermore, if the 41-st identification information is the information indicating that the UE is located outside the LADN service area, then the SMF and/or the AMF may not include the back-off timer value in the PDU session establishment reject message. In other words, if the 41-st identification information is information other than the information indicating that the UE is located outside the LADN service area, then the SMF and/or the AMF may also include the back-off timer value in the PDU session establishment reject message.

Here, if the 41-st identification information is transmitted, then the network device may instruct the UE to delete the LADN information stored in the UE, or may also instruct the UE to delete, from the LADN information stored in the UE, the LADN DNN requested by the UE. Furthermore, if the 41-st identification information is transmitted, then the network device may indicate to the UE that the LADN DNN requested by the UE is invalid, or may also indicate that the LADN DNN requested by the UE needs to be invalidated.

Furthermore, if the 41-st identification information is transmitted, then the network device may also instruct the UE to identify that the LADN DNN provided in the PDU session establishment procedure is invalid, or may also instruct the UE to invalidate the LADN DNN provided in the PDU session establishment procedure.

Furthermore, if the 41-st identification information is transmitted, then the network device may execute the registration procedure after completion of this procedure, or may also initiate the UE configuration update procedure (generic UE configuration update procedure). In addition, the registration procedure may be a registration procedure for movement and registration update. Furthermore, the registration procedure may also be a procedure for providing new LADN information to the UE. Furthermore, the UE configuration update procedure may be a procedure initiated by transmitting a configuration update command message to the UE by means of the AMF, and may also be a procedure for providing new LADN information to the UE.

In other words, if the transmitted 5GSM cause value is a cause value indicating that the UE is out of the LADN service, then the network device may also instruct the UE to delete the LADN information stored in the UE, or may also instruct the UE to delete, from the LADN information stored in the UE, the LADN DNN requested by the UE. Furthermore, if the transmitted 5GSM cause value is a cause value indicating that the network device is out of the LADN service, then the network device may also indicate to the UE that the LADN DNN requested by the network device is invalid, or may also indicate that the LADN DNN requested by the UE needs to be invalidated.

Furthermore, if the transmitted 5GSM cause value is a cause value indicating that the UE is out of the LADN service, then the network device may instruct the UE to identify that the LADN DNN provided in the PDU session establishment procedure is invalid, or may also instruct the UE to invalidate the LADN DNN provided in the PDU session establishment procedure.

Furthermore, if the transmitted 5GSM cause value is a cause value indicating that the UE is out of the LADN service, then the network device may execute the registration procedure after completion of this procedure, or may also initiate the UE configuration update procedure (generic UE configuration update procedure). In addition, the registration procedure may be a registration procedure for movement and registration update. Furthermore, the registration procedure may also be a procedure for providing new LADN information to the UE. Furthermore, the UE configuration update procedure may be a procedure initiated by transmitting a configuration update command message to the UE by means of the AMF, and may also be a procedure for providing new LADN information to the UE.

In addition, the SMF and/or the AMF may also select and determine, on the basis of the received identification information and/or the subscriber information and/or the network capability information and/or the operator policy and/or the network status and/or the user registration information and/or the text stored by the AMF, etc., whether to include at least the 41-st identification information in the PDU session establishment reject message. Specifically, if the UE is located outside the LADN service area, then the SMF and/or the AMF may also include the 41-st identification information in the PDU session establishment reject message. In addition, the LADN service area may be an LADN service area corresponding to the LADN DNN requested by the UE.

By receiving the PDU session establishment reject message, the UE can identify that the UE request concerning the PDU session establishment request is rejected, and can identify content of various identification information included in the PDU session establishment reject message.

Each device completes the PDU session establishment procedure on the basis of completion of the procedure in (A) or (B) in FIG. 7. In addition, each device may transition, on the basis of completion of the procedure in (A) in FIG. 7, to a state in which the PDU session has been established, or may identify, on the basis of completion of the procedure in (B) in FIG. 7, that the PDU session establishment procedure is rejected, or may transition to a state in which the PDU session establishment procedure has not been established. Furthermore, on the basis of completion of the procedure in (A) in FIG. 7, the UE may use the established PDU session to communicate with the DN.

Furthermore, on the basis of completion of the PDU session establishment procedure, each device may also process information received and transmitted in the PDU session establishment procedure. For example, if the information indicating that part of the requests of the UE are rejected is received and transmitted, then each device may also identify a reason as to why the request of the UE is rejected. Furthermore, on the basis of the reason as to why the request of the UE is rejected, each device may execute this procedure again, or may also execute the PDU session establishment procedure for other units.

Furthermore, the UE may store, on the basis of completion of the PDU session establishment procedure, identification information received together with the PDU session establishment accept message and/or the PDU session establishment reject message, or may also identify a decision made by the network.

For example, if the 36-th identification information is received and transmitted, then each device may also establish a PDU session to the DNN indicated by the 36-th identification information. Furthermore, if the 36-th identification information is received, then the UE may also identify that a PDU session corresponding to the DNN indicated by the 36-th identification information needs to be established. Furthermore, if the 36-th identification information is received, then the UE may also identify the DNN selected and determined by the network. In addition, the 36-th identification information may also be a DNN for identifying a DN indicated by identification information received and transmitted together with the 36-th identification information and supporting one or more functions. Furthermore, the 36-th identification information may be the DNN received in the registration procedure, or may also be the LADN.

Furthermore, if the back-off timer value is received, then the UE may configure a back-off timer with the back-off timer value, or may also start the back-off timer configured with the received back-off timer value. Here, if the back-off timer value is received but the 41-st identification information is received, then the UE may skip the received back-off timer value, or may not start the back-off timer. Conversely, even if the back-off timer value and the 41-st identification information are received, the UE may also configure the back-off timer with the received back-off timer value, or may also start the back-off timer configured with the received back-off timer value.

Specifically, if the 41-st identification information indicating that the UE is located outside the LADN service area is received, then the UE may skip the received back-off timer value, or may not start the back-off timer. Conversely, if the 41-st identification information indicating that the UE is located outside the LADN service area is received, then the UE may configure the back-off timer with the back-off timer value, or may also start the back-off timer configured with the received back-off timer value.

Furthermore, if the 41-st identification information is received, after completion of this procedure, then the UE may initiate the PDU session establishment procedure on the basis of completion of this procedure and/or reception of the 41-st identification information and under another condition. In addition, if the UE executes the back-off timer, then the PDU session establishment procedure may also be initiated under another condition and after the back-off timer expires.

Here, the so-called the UE initiating the PDU session establishment procedure under another condition includes, for example, the UE initiating the PDU session establishment procedure by configuring a DNN information element with an LADN DNN different from previously transmitted LADN DNNs and then transmitting the same to the network, or the UE initiating the PDU session establishment procedure by modifying the area in which the UE is located and then transmitting the PDU session establishment request message, or the UE initiating the PDU session establishment procedure by reflecting modification of these combinations. In addition, the UE may also configure the DNN information element with an LADN DNN reselected from the LADN information stored in the UE.

Alternatively, the so-called the UE initiating the PDU session establishment procedure under another condition includes the UE initiating the PDU session establishment procedure without using any LADN DNN. Specifically, the UE may not include any LADN DNN in the PDU session establishment request message and then transmit the same to request a PDU session for devices other than a 5GLAN.

If the 41-st identification information is received, then after completion of this procedure, the UE may transition to a state in which the PDU session establishment procedure of the LADN DNN requested by the UE is not initiated or is stopped or is prohibited. Here, the so-called PDU session establishment procedure of the LADN DNN requested by the UE may be a PDU session establishment procedure initiated by transmitting a PDU session establishment request message including LADN DNNs previously requested by the UE. In other words, if the 41-st identification information is received, then the UE may be prohibited from using the PDU session establishment procedure of the same LADN DNN, or may also be prohibited from transmitting the PDU session establishment request message including the same LADN DNN.

If the 41-st identification information is received, then after completion of this procedure, during a period ending at a time point when the status of the UE changes, the UE may also be prohibited from transmitting, in the same PLMN, a PDU session establishment request message including the same LADN DNN. Here, the change in the status of the UE may be that a power supply of the UE is turned off, or may also be that a US1M is discarded. Furthermore, the change in the status of the UE may also be that the information stored by the UE is updated. Here, the information stored by the UE may also be the LADN information. Furthermore, update of the information stored by the UE may be performed by means of the registration procedure, or may also be performed by means of the UE configuration update procedure.

In other words, if the 41-st identification information is received, then after completion of this procedure, during a period ending at a time point when the registration procedure or the UE configuration update procedure is executed, the UE may also be prohibited from executing a PDU session establishment procedure for the same LADN in the same PLMN, or may also be prohibited from transmitting a PDU session establishment request message for initiating the PDU session establishment procedure. Furthermore, in other words, if the 41-st identification information is received, then after completion of this procedure, during a period ending at a time point when the registration procedure or the UE configuration update procedure is executed, the UE may also be prohibited from transmitting, in the same PLMN, the PDU session establishment request message including the same LADN DNN.

If the 41-st identification information is received, after completion of this procedure, then the UE may also transition, within a certain period, to a state in which transmission of the PDU session establishment request message including the same LADN DNN is prohibited, or may also transition to a state in which transmission of the PDU session establishment request message including the same LADN DNN performed in the same PLMN is prohibited, or may also transition to a state in which transmission of the PDU session establishment request message including the same LADN DNN performed in the same area is prohibited. Here, the certain period may be a period configured by the back-off timer value, or may also be a period configured by another network or other UE.

If the 41-st identification information is received, then the UE may delete the LADN information stored therein, or may also delete, from the LADN information stored therein, the LADN DNN requested by the UE. Furthermore, if the 41-st identification information is received, then the UE may identify that the LADN DNN requested by the UE is invalid, or may also invalidate the LADN DNN requested by the UE.

In other words, if the 41-st identification information is received, then the UE may identify that the LADN DNN provided in the PDU session establishment procedure is invalid, or may also invalidate the LADN DNN provided in the PDU session establishment procedure.

Furthermore, if the 41-st identification information is received, then the UE may also initiate the registration procedure. In addition, the registration procedure may be a registration procedure for movement and registration update. Furthermore, the registration procedure may also be a procedure for requesting new LADN information. Furthermore, if the LADN information is received in the registration procedure, then the UE may also store the received LADN information.

In other words, if the 41-st identification information is received, then the UE may also request LADN information. Here, the LADN information may also be LADN information for the LADN DNN provided in the PDU session establishment procedure.

In other words, if the received 5GSM cause value is a cause value indicating that the UE is out of the LADN service, then the UE may delete the LADN information stored therein, or may also delete, from the LADN information stored therein, the LADN DNN requested by the UE. Furthermore, if the received 5GSM cause value is a cause value indicating that the UE is out of the LADN service, then the UE may identify that the LADN DNN requested by the UE is invalid, or may also invalidate the LADN DNN requested by the UE.

In other words, if the received 5GSM cause value is a cause value indicating that the UE is out of the LADN service, then the UE may identify that the LADN DNN provided in the PDU session establishment procedure is invalid, or may also invalidate the LADN DNN provided in the PDU session establishment procedure.

In addition, deleting the LADN DNN may refer to deleting the information indicating LADN consisting of the LADN DNN, or may also refer to deleting the LADN information including the LADN DNN. Furthermore, identifying that the LADN DNN is invalid may refer to identifying that the information indicating LADN consisting of the LADN DNN is invalid, or may also refer to identifying that the LADN information including the LADN DNN is invalid. Furthermore, invalidating the LADN DNN may refer to invalidating the information indicating LADN consisting of the LADN DNN, or may also refer to invalidating the LADN information including the LADN DNN.

Furthermore, if the received 5GSM cause value is a cause value indicating that the UE is out of the LADN service, then the UE may also initiate the registration procedure. More specifically, if the received 5GSM cause value is a cause value indicating that the UE is out of the LADN service, then the UE may also initiate the registration procedure on the basis of a request from the upper layer and/or an instruction from the user.

In addition, the registration procedure may be a registration procedure for movement and registration update. Furthermore, the registration procedure may also be a procedure for requesting new LADN information. Furthermore, if the LADN information is received in the registration procedure, then the UE may also store the received LADN information. In addition, the UE may also transmit a registration request message including the 2-nd identification information in the registration procedure to request new LADN information, or may also acquire the LADN information from the network. In addition, even if a registration request message not including the 2-nd identification information is transmitted in the registration procedure, the UE may also acquire the LADN information from the network.

Here, the UE may also initiate the registration procedure in order to synchronize the LADN information with the network. Furthermore, the UE may also initiate the registration procedure in order to avoid failures caused outside the LADN service area.

In other words, if the received 5GSM cause value is a cause value indicating that the UE is out of the LADN service, then the UE may also request the LADN information. Here, the LADN information may also be LADN information for the LADN DNN provided in the PDU session establishment procedure.

3.2.3 PDU Session Modification Procedure

Next, brief description for the PDU sesson modification procedure performed in order to modify the PDU session is provided. The PDU session modification procedure is a procedure in the 5GS. In addition, each device may initiate the PDU session modification procedure at any timing in the registered state that the device entered after completion of the registration procedure. In other words, each device may initiate the PDU session modification procedure at any timing in a state in which the PDU session has been established. In addition, each device may also execute the PDU session modification procedure in the registration procedure. In addition, each device may also establish a PDU session on the basis of completion of the PDU session modification procedure. In addition, the PDU session modification procedure may be a procedure initiated by the UE, or may also be a procedure initiated by the UE request. Furthermore, the PDU session modification procedure may be a procedure initiated by the network, and may also be a procedure initiated by a network request. Brief description for the steps of the PDU session modification procedure is provided below.

Firstly, the UE transmits a PDU session modification request message to the SMF by means of the AMF so as to initiate the PDU session modification procedure. Specifically, the UE transmits, by means of the 5G AN (gNB) and the N1 interface, a NAS message including a PDU session modification request message to the AMF (S900). In addition, the NAS message including the PDU session modification request message may also be an MM message. Furthermore, the MM message may also be an uplink NAS transport (UL NAS TRANSPORT) message. Here, a case in which the PDU session modification request message includes identification information and/or a value may refer to that the identification information and/or the value is included in the MM message including the PDU session modification request message.

Here, the UE may also include at least information indicating the PDU session ID in the PDU session modification request message and then transmit the same. Furthermore, the UE may also include the information indicating the PDU session ID in the PDU session modification request message to indicate a PDU session that is requested to be modified. In addition, the PDU session ID may also be information for identifying the PDU session established in the PDU session establishment procedure.

The AMF and/or the SMF receives the PDU session modification request message. If the AMF and/or the SMF receives the request of the UE, then the AMF and/or the SMF transmits a PDU session modification command message to the UE. Conversely, if the AMF and/or the SMF rejects the request of the UE, then the AMF and/or the SMF transmits a PDU session modification reject message to the UE.

Description for the AMF and/or the SMF accepting the request of the UE is provided below. The UE receives the PDU session modification command message from the SMF by means of the AMF. Furthermore, the UE may also transmit a PDU session modification complete message on the basis of reception of the PDU session modification command message. Furthermore, each device may also receive and transmit the PDU session modification command message and/or the PDU session modification complete message to complete the PDU session modification procedure. Here, the PDU session modification command message may be a response message to the PDU session modification request message. Furthermore, the PDU session modification complete message may be a response message to the PDU session modification command message.

Next, description for the AMF and/or the SMF rejecting the request of the UE is provided below. The UE receives the PDU session modification reject message from the SMF by means of the AMF. Furthermore, each device may also receive and transmit the PDU session modification reject message to complete the PDU session modification procedure. Here, the PDU session modification reject message may be a response message to the PDU session modification request message. Furthermore, the PDU session modification complete message may be a response message to the PDU session modification reject message.

Here, the SMF and/or the AMF may also include at least the 41-st identification information and/or the back-off timer value in the PDU session modification reject message and then transmit the same or may also transmit the 41-st identification information and/or the back-off timer value to indicate that the request of the UE is rejected or to indicate a reason as to why the request of the UE is rejected.

Furthermore, the SMF and/or the AMF may transmit the 41-st identification information to indicate that the request for modifying the PDU session for LADN is rejected or to indicate that the PDU session for LADN is not modified. Furthermore, the SMF and/or the AMF may indicate that the UE is out of the LADN service, or may also indicate that the PDU session for LADN cannot be modified in the current area. Furthermore, the SMF and/or the AMF may also transmit the 41-st identification information to indicate that the LADN information stored by the UE is not valid or to indicate that the LADN information stored by the UE needs to be updated. Here, the LADN service area may also be an LADN service area corresponding to the LADN DNN.

Furthermore, the SMF and/or the AMF may also transmit the back-off timer value to instruct the UE to configure the back-off timer value to be the transmitted value or to instruct the back-off timer configured with the transmitted value to start.

Furthermore, if the 41-st identification information is the information indicating that the UE is located outside the LADN service area, then the SMF and/or the AMF may not include the back-off timer value in the PDU session modification reject message. In other words, if the 41-st identification information is information other than the information indicating that the UE is located outside the LADN service area, then the SMF and/or the AMF may also include the back-off timer value in the PDU session modification reject message.

Here, if the 41-st identification information is transmitted, then the network device may instruct the UE to delete the LADN information stored in the UE, or may also instruct the UE to delete the LADN DNN from the LADN information stored in the UE. Furthermore, if the 41-st identification information is transmitted, then the network device may indicate to the UE that the LADN DNN is invalid, or may also indicate that the LADN DNN needs to be invalidated.

Furthermore, if the 41-st identification information is transmitted, then the network device may instruct the UE to identify that the LADN DNN provided in the PDU session modification procedure is invalid, or may also instruct the UE to invalidate the LADN DNN provided in the PDU session modification procedure.

Furthermore, if the 41-st identification information is transmitted, then the network device may execute the registration procedure after completion of this procedure, or may also initiate the UE configuration update procedure (generic UE configuration update procedure). In addition, the registration procedure may be a registration procedure for movement and registration update. Furthermore, the registration procedure may also be a procedure for providing new LADN information to the UE. Furthermore, the UE configuration update procedure may be a procedure initiated by transmitting a configuration update command message to the UE by means of the AMF, and may also be a procedure for providing new LADN information to the UE.

Furthermore, the network device may also transmit the 41-st identification information to indicate that initiation of the PDU session modification procedure for the PDU session corresponding to the LADN DNN is prohibited after completion of this procedure. Furthermore, the network device may also transmit the 41-st identification information to indicate that after completion of this procedure, the UE is prohibited from transmitting the PDU session modification request message for the PDU session corresponding to the LADN DNN.

Furthermore, the network device may also transmit the 41-st identification information in order to indicate that the UE is prohibited from initiating the PDU session modification procedure for the PDU session corresponding to the LADN DNN. Furthermore, the network device may also transmit the 41-st identification information in order to indicate that the UE is prohibited from transmitting the PDU session modification request message for the PDU session corresponding to the LADN DNN.

In other words, if the transmitted 5GSM cause value is a cause value indicating that the UE is out of the LADN service, then the network device may instruct the UE to delete the LADN information stored in the UE, or may also instruct the UE to delete the LADN DNN from the LADN information stored in the UE. Furthermore, if the transmitted 5GSM cause value is a cause value indicating that the network device is out of the LADN service, then the network device may indicate to the UE that the LADN DNN requested by the network device is invalid, or may also indicate that the LADN DNN needs to be invalidated.

Furthermore, if the transmitted 5GSM cause value is a cause value indicating that the UE is out of the LADN service, then the network device may instruct the UE to identify that the LADN DNN provided in the PDU session modification procedure is invalid, or may also instruct the UE to invalidate the LADN DNN provided in the PDU session modification procedure.

Furthermore, if the transmitted 5GSM cause value is a cause value indicating that the UE is out of the LADN service, then the network device may execute the registration procedure after completion of this procedure, and may also initiate the UE configuration update procedure (generic UE configuration update procedure). In addition, the registration procedure may be a registration procedure for movement and registration update. Furthermore, the registration procedure may also be a procedure for providing new LADN information to the UE. Furthermore, the UE configuration update procedure may be a procedure initiated by transmitting a configuration update command message to the UE by means of the AMF, and may also be a procedure for providing new LADN information to the UE.

Furthermore, the network device may also transmit the 5GSM cause value indicating that the UE is out of the LADN service to indicate that after completion of this procedure, the UE is prohibited from initiating the PDU session modification procedure for the PDU session corresponding to the LADN DNN. Furthermore, the network device may also transmit the 5GSM cause value indicating that the UE is out of the LADN service to indicate that after completion of this procedure, the UE is prohibited from transmitting the PDU session modification request message for the PDU session corresponding to the LADN DNN.

Furthermore, the network device may also transmit the 5GSM cause value indicating that the UE is out of the LADN service in order to indicate that the UE is prohibited from initiating the PDU session modification procedure for the PDU session corresponding to the LADN DNN. Furthermore, the network device may also transmit the 5GSM cause value indicating that the UE is out of the LADN service in order to indicate that the UE is prohibited from transmitting the PDU session modification request message for the PDU session corresponding to the LADN DNN.

In addition, the SMF and/or the AMF may also select and determine, on the basis of the received identification information and/or the subscriber information and/or the network capability information and/or the operator policy and/or the network status and/or the user registration information and/or the text stored by the AMF, etc., whether to include at least the 41-st identification information in the PDU session modification reject message. Specifically, if the UE is located outside the LADN service area, then the SMF and/or the AMF may also include the 41-st identification information in the PDU session modification reject message. In addition, the LADN service area may be an LADN service area corresponding to the LADN DNN.

Furthermore, the UE may also store, on the basis of completion of the PDU session modification procedure, identification information received together with the PDU session modification command message and/or the PDU session modification reject message, or may also identify a decision made by the network.

For example, if the back-off timer value is received, then the UE may configure the back-off timer with the back-off timer value, or may also start the back-off timer configured with the received back-off timer value. Here, if the back-off timer value is received but the 41-st identification information is received, then the UE may skip the received back-off timer value, and may not start the back-off timer. Conversely, even if the back-off timer value and the 41-st identification information are received, then the UE may also configure the back-off timer with the received back-off timer value, or may also start the back-off timer configured with the received back-off timer value.

Specifically, if the 41-st identification information indicating that the UE is located outside the LADN service area is received, then the UE may skip the received back-off timer value, or may not start the back-off timer. Conversely, if the 41-st identification information indicating that the UE is located outside the LADN service area is received, then the UE may configure the back-off timer with the back-off timer value, or may also start the back-off timer configured with the received back-off timer value.

Furthermore, if the 41-st identification information is received, then after completion of this procedure, the UE may initiate the PDU session modification procedure on the basis of completion of this procedure and/or reception of the 41-st identification information and under another condition. In addition, if the UE executes the back-off timer, then the PDU session establishment procedure may also be initiated under another condition and after the back-off timer expires.

Here, the so-called the UE initiating the PDU session modification procedure under another condition includes, for example, the UE initiating the PDU session modification procedure by configuring a PDU session ID information element with a PDU session ID different from previously transmitted PDU session IDs and then transmitting the same to the network, or the UE initiating the PDU session modification procedure by modifying the area in which the UE is located and then transmitting the PDU session modification request message, or the UE initiating the PDU session modification procedure by reflecting modification of these combinations. Here, the so-called PDU session ID different from the previously transmitted PDU session IDs may be a PDU session ID for identifying the PDU session for LADN.

If the 41-st identification information is received, then after completion of this procedure, the UE may transition to a state in which the PDU session modification procedure for the PDU session corresponding to the LADN DNN is not initiated or is stopped or is prohibited. Here, the PDU session corresponding to the LADN DNN may be a PDU session for LADN. Furthermore, the so-called PDU session modification procedure for the PDU session corresponding to the LADN DNN may be a PDU session modification procedure initiated by transmitting the PDU session modification request message described below, and the PDU session modification request message includes a PDU session ID for identifying the PDU session corresponding to the LADN DNN. In other words, if the 41-st identification information is received, then the UE may be prohibited from transmitting a PDU session modification request message including the same PDU session ID, or may also be prohibited from using a PDU session modification procedure with the PDU session ID described below; the PDU session ID is for identifying a PDU session corresponding to the same LADN DNN. In other words, if the 41-st identification information is received, then after completion of this procedure, the UE is prohibited from being used in the PDU session modification procedure for the PDU session corresponding to the LADN DNN, or may be prohibited from transmitting the PDU session modification request message for the PDU session corresponding to the LADN DNN.

If the 41-st identification information is received, then after completion of this procedure, during a period ending at a time point when the status of the UE changes, the UE is prohibited from transmitting, in the same PLMN, a PDU session modification request message including the PDU session ID described below; the PDU session ID is for identifying a PDU session corresponding to the same LADN DNN. Here, the change in the status of the UE may be that a power supply of the UE is turned off, and may also be that a US1M is discarded. Furthermore, the change in the status of the UE may also be that the information stored by the UE is updated. Here, the information retained by the UE may also be the LADN information. Furthermore, update of the information stored by the UE may be performed by means of the registration procedure, or may also be performed by means of the UE configuration update procedure.

In other words, if the 41-st identification information is received, then after completion of this procedure, during a period ending at a time point when the registration procedure or the UE configuration update procedure is executed, the UE may be prohibited from executing, in the same PLMN, a PDU session modification procedure for the PDU session corresponding to the same LADN DNN, or may also be prohibited from transmitting a PDU session modification request message for the PDU session modification procedure. Furthermore, in other words, if the 41-st identification information is received, then after completion of this procedure, during a period ending at a time point when the registration procedure or the UE configuration update procedure is executed, the UE may be prohibited from transmitting, in the same PLMN, a PDU session modification request message including the PDU session ID described below; the PDU session ID is for identifying a PDU session corresponding to the same LADN DNN.

If the 41-st identification information is received, then after completion of this procedure, the UE may transition, within a certain period, to a state in which transmission of a PDU session modification request message including the PDU session ID described below is prohibited, or may also transition to a state in which transmission of the PDU session modification request message including the PDU session ID described below performed in the same PLMN is prohibited, or may also transition to a state in which transmission of the PDU session modification request message including the PDU session ID described below performed in the same area is prohibited; the PDU session ID is for identifying a PDU session corresponding to the same LADN DNN. Here, the certain period may be a period configured by the back-off timer value, or may also be a period configured by another network or other UE.

If the 41-st identification information is received, then the UE may delete the LADN information stored therein, or may also delete, from the LADN information stored therein, an LADN service area and/or an LADN DNN corresponding to the PDU session that the UE requests to modify. Furthermore, if the 41-st identification information is received, then the UE may identify that the LADN service area and/or the LADN DNN stored by the UE is invalid, or may also invalidate the LADN service area and/or the LADN DNN stored by the UE.

In other words, if the 41-st identification information is received, then the UE may identify that the LADN service area and/or the LADN DNN corresponding to the PDU session identified by means of the PDU session ID provided in the PDU session modification procedure is invalid, or may also invalidate the LADN service area and/or the LADN DNN corresponding to the PDU session identified by means of the PDU session ID provided in the PDU session modification procedure.

Furthermore, if the 41-st identification information is received, then the UE may also initiate the registration procedure. In addition, the registration procedure may be a registration procedure for movement and registration update. Furthermore, the registration procedure may also be a procedure for requesting new LADN information. Furthermore, if the LADN information is received in the registration procedure, then the UE may also store the received LADN information.

In other words, if the 41-st identification information is received, then the UE may also request the LADN information. Here, the LADN information may also be LADN information for the LADN DNN corresponding to the PDU session identified by means of the PDU session ID provided in the PDU session modification procedure. Furthermore, the LADN information may also be LADN information for the LADN DNN provided in the PDU session establishment procedure.

In other words, if the received 5GSM cause value is a cause value indicating that the UE is out of the LADN service, then the UE may delete the LADN information stored therein, or may also delete, from the LADN information stored therein, the LADN service area and/or the LADN DNN corresponding to the PDU session that the UE requests to modify. Furthermore, if the received 5GSM cause value is a cause value indicating that the UE is out of the LADN service, then the UE may identify that the LADN service area and/or the LADN DNN corresponding to the PDU session that the UE requests to modify is invalid, or may also invalidate the LADN service area and/or the LADN DNN corresponding to the PDU session that the UE requests to modify.

In other words, if the received 5GSM cause value is a cause value indicating that the UE is out of the LADN service, then the UE may identify that the LADN service area and/or the LADN DNN corresponding to the PDU session identified by means of the PDU session ID provided in the PDU session modification procedure is invalid, or may also invalidate the LADN service area and/or the LADN DNN corresponding to the PDU session identified by means of the PDU session ID provided in the PDU session modification procedure.

In addition, deleting the LADN service area and/or the LADN DNN may refer to deleting the LADN service area and/or the information indicating LADN consisting of the LADN DNN, or may also refer to deleting the LADN service area and/or the LADN information including the LADN DNN. Furthermore, identifying that the LADN service area and/or the LADN DNN is invalid may refer to identifying that the LADN service area and/or the information indicating LADN consisting of the LADN DNN is invalid, or may also refer to identifying that the LADN service area and/or the LADN information including the LADN DNN is invalid. Furthermore, invalidating the LADN service area and/or the LADN DNN may refer to invalidating the LADN service area and/or the information indicating LADN consisting of the LADN DNN, or may also refer to invalidating the LADN service area and/or the LADN information including the LADN DNN.

Furthermore, if the received 5GSM cause value is a cause value indicating that the UE is out of the LADN service, then the UE may also initiate the registration procedure. More specifically, if the received 5GSM cause value is a cause value indicating that the UE is out of the LADN service, then the UE may also initiate the registration procedure on the basis of a request from the upper layer and/or an instruction from the user.

In addition, the registration procedure may be a registration procedure for movement and registration update. Furthermore, the registration procedure may also be a procedure for requesting new LADN information. Furthermore, if the LADN information is received in the registration procedure, then the UE may also store the received LADN information. In addition, the UE may transmit a registration request message including the 2-nd identification information in the registration procedure to request new LADN information, or may also acquire the LADN information from the network. In addition, even if a registration request message not including the 2-nd identification information is transmitted in the registration procedure, the UE may also acquire the LADN information from the network.

Here, the UE may also initiate the registration procedure in order to synchronize the LADN information with the network. Furthermore, the UE may also initiate the registration procedure in order to avoid failures caused outside the LADN service area.

In other words, if the received 5GSM cause value is a cause value indicating that the UE is out of the LADN service, then the UE may also request the LADN information. Here, the LADN information may be LADN information for the LADN DNN corresponding to the PDU session identified by means of the PDU session ID provided in the PDU session modification procedure. Furthermore, the LADN information may also be LADN information for the LADN DNN provided in the PDU session establishment procedure.

4. First Embodiment

Next, description for a first embodiment is provided. Hereinafter, the first embodiment is referred to as this embodiment. In a communication procedure of this embodiment, firstly, each device performs a registration procedure initiated by UE. Next, each device performs a PDU session establishment procedure initiated by the UE to establish a PDU session and to transition to a state in which the PDU session can be used to perform communication between the UE and a DN. Next, each device uses the PDU session to receive and transmit user data. Then, after establishment of the PDU session, each device performs a PDU session modification procedure to modify a status of the PDU session. By means of the above operations, the procedure of this embodiment is completed.

In addition, in the procedure of this embodiment, each device may also exchange support information of extension of an LADN service area and/or LADN information between the UE and a network in the registration procedure.

Furthermore, each device may also establish a PDU session for LADN between the UE and the network in the PDU session establishment procedure on the basis of the information exchanged in the registration procedure. In addition, the PDU session for LADN may be a PDU session that can be established only if the UE exists in a specific area. Here, the so-called specific area may also be, for example, the LADN service area.

Furthermore, each device may also use the established PDU session to perform communication of user data between the device and an LADN. Furthermore, each device may release the established PDU session on the basis of update of the LADN information and/or a change in a status of the LADN service area, or may also release a user plane resource associated with the established PDU session.

Furthermore, if the request of the PDU session establishment procedure is rejected, then each device may not establish a PDU session. In this case, after completion of the PDU session establishment procedure, each device may perform processing based on information included in a PDU session establishment reject message, or may also complete the procedure of this embodiment by performing processing based on the information included in the PDU session establishment reject message.

Furthermore, if the request for the PDU session modification procedure is rejected, then each device may not modify the PDU session. In this case, after completion of the PDU session modification procedure, each device may perform processing based on information included in a PDU session modification reject message, or may also complete the procedure of this embodiment by performing processing based on the information included in the PDU session modification reject message.

5. Variations

A program running on the device according to the present invention may be a program that controls a Central Processing Unit (CPU) and the like in a manner for implementing the functions of the embodiments of the present invention so as to cause a computer to implement functions. The program or information processed by the program is temporarily stored in a volatile memory such as a Random Access Memory (RAM), a non-volatile memory such as a flash memory, a Hard Disk Drive (HDD), or another storage device system.

In addition, a program for implementing the functions of the embodiments of the present invention may also be recorded on a computer-readable recording medium. The functions of the embodiments of the present invention may also be implemented by causing a computer system to read and execute the program recorded on the recording medium. The so-called "computer system" refers to a computer system built in the device, and the computer system includes an operating system and hardware such as a peripheral device. In addition, the so-called "computer-readable recording medium" may also be a semiconductor recording medium, an optical recording medium, a magnetic recording medium, a medium dynamically retaining the program for a short time, or any other computer-readable recording medium.

In addition, each functional block or various features of the device used in the embodiment may be mounted on or executed by an electrical circuit such as an integrated circuit or a plurality of integrated circuits. An electric circuit designed to implement the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may also be an existing processor, controller, microcontroller, or boot machine. The electric circuit may include a digital circuit, or may include an analog circuit. In addition, with advances in semiconductor technology, a circuit integration technology appears, and replaces current integrated circuits; therefore, one or more aspects of the present invention can also use a new integrated circuit based on the technology.

In addition, the invention of the present application is not limited to the embodiments described above. In the embodiments, devices have been described as an example; however, the invention of the present application is not limited thereto, and is also applicable to a fixed-type electronic machine or a stationary-type electronic machine provided indoors or outdoors, including terminal devices or communication devices such as an AV machine, a kitchen machine, a cleaning/washing machine, an air conditioner, an office machine, a vending machine, and other household machines.

The embodiments of the present invention have been described in detail with reference to the drawings; however, the specific structure is not limited to the embodiments, and includes a design modification falling within the scope not departing from the gist of the present invention. In addition, various modifications can be made to the present invention within the scope defined by the claims, and embodiments acquired by suitably combining technical means disclosed in different embodiments are also included in the technical scope of the present invention. In addition, a structure in which elements described in the embodiments and having the same effect are substituted for one another is also included in the technical scope of the present invention.

REFERENCE NUMERAL LIST

1 Mobile communication system
5 PDN_A
6 DN_A
10 UE_A
30 PGW-U
32 PGW-C
35 SGW
40 MME
50 HSS
60 PCRF
80 Access network_A, E-UTRAN
90 Core network_A
120 Access network B, 5G AN
130 UPF
132 SMF
140 AMF
150 UDM
160 PCF
190 Core network_B
300 Control portion_A
310, 510 Antenna
320 Transceiver portion_A
340 Storage portion_A
500, 700 Control portion_B
520, 720 Network connection portion_B
530 Transceiver portion_B
540, 740 Storage portion_B
S800-S812, S900-S924 Steps

What is claimed is:

1. A user device for implementing error handling, the user device comprising:
a control unit that establishes, with at least one control device in a core network, in a Protocol Data Unit (PDU) session establishment procedure, using a Local Area Data Network (LADN) Data Network Name (DNN), a PDU session for the LADN; and
a transceiver unit that:
transmits, to the at least one control device in the core network, a first PDU session modification request message used to initiate a PDU session modification procedure,
receives, in the PDU session modification procedure, an No. 46 5G Session Management (5GSM) cause value from the at least one control device in the core network, and
prohibits, based on the No. 46 5GSM cause value, transmission of a second PDU session modification request message for the PDU session,
wherein:
the LADN DNN is provided by the user device in the PDU session establishment procedure, the No. 46 5GSM cause value indicates an update to LADN information stored at the user device,
the user device requests, based on reception of the No. 46 5GSM cause value, new LADN information by including an LADN indication information element in a registration request message used to initiate a registration procedure for requesting the new LADN information, and the transmission of the second PDU session modification request message for the PDU session for the LADN is prohibited until the registration procedure for requesting the new LADN information is completed.

2. The user device according to claim 1, wherein the transceiver unit further requests the new LADN information by including the LADN indication information element in the registration request message in order to synchronize the LADN information and avoid failures caused outside an LADN service area.

3. At least one control device in a core network for implementing error handling, the at least one control device in the core network comprising:

a transceiver unit that:
receives, from a user device, a first Protocol Data Unit (PDU) session modification request message used to initiate a PDU session modification procedure,
transmits, in the PDU session modification procedure, an No. 46 5G Session Management (5GSM) cause value to the user device in order to indicate that the user device is prohibited from transmitting a second PDU session modification request message for a PDU session for a Local Area Data Network (LADN), and
receives, from the user device, a registration request message used to initiate a registration procedure for requesting new LADN information, wherein:
the PDU session for the LADN is established in a PDU session establishment procedure using an LADN Data Network Name (DNN),
the LADN DNN is provided in the PDU session establishment procedure, the No. 46 5GSM cause value indicates an update to LADN information stored at the user device,
the registration request message includes an LADN indication information element and is transmitted based on reception of the No. 46 5GSM cause value, and
the transmission of the second PDU session modification request message for the PDU session for the LADN is prohibited until the registration procedure for requesting the new LADN information is completed.

4. A communication control method performed by a user device for implementing error handling, the communication control method comprising:

establishing, with at least one control device in a core network, a Protocol Data Unit (PDU) session for a Local Area Data Network (LADN) in a PDU session establishment procedure that uses an LADN Data Network Name (DNN);
transmitting, to the at least one control device in the core network, a first PDU session modification request message used to initiate a PDU session modification procedure,
receiving, in the PDU session modification procedure, an No. 46 5G Session Management (5GSM) cause value from the at least one control device in the core network; and
prohibiting, based on reception of the No. 46 5GSM cause value, transmission of a second PDU session modification request message for the PDU session,
wherein:
the LADN DNN is provided by the user device in the PDU session establishment procedure,
the No. 46 5GSM cause value indicates an update to LADN information stored at the user device,
the user device requests, based on reception of the No. 46 5GSM cause value, new LADN information by including an LADN indication information element in a registration request message used to initiate a registration procedure for requesting the new LADN information, and
the transmission of the second PDU session modification request message for the PDU session for the LADN is prohibited until the registration procedure for requesting the new LADN information is completed.

5. The communication control method according to claim 4, further comprising:

requesting the new LADN information by including the LADN indication information element in the registration request message in order to synchronize the LADN information and avoid failures caused outside an LADN service area.

* * * * *